United States Patent [19]
Ueyama et al.

[11] Patent Number: 5,550,442
[45] Date of Patent: Aug. 27, 1996

[54] HORIZONTAL DEFLECTION CIRCUIT

[75] Inventors: Toshinari Ueyama, Neyagawa; Nobuyoshi Nagagata, Takatsuki, both of Japan

[73] Assignee: Matsushita Electric Industrial Co., Ltd., Osaka, Japan

[21] Appl. No.: 356,889

[22] Filed: Dec. 15, 1994

[30] Foreign Application Priority Data

Dec. 16, 1993 [JP] Japan .................................. 5-316352
Aug. 9, 1994 [JP] Japan .................................. 6-187473

[51] Int. Cl.$^6$ .............................. G09G 1/04; H01J 29/70
[52] U.S. Cl. .......................... 315/371; 315/396; 315/408
[58] Field of Search .................................. 315/371, 408, 315/396, 395

[56] References Cited

U.S. PATENT DOCUMENTS 4,206,388 6/1980 Ishigaki et al. ........................ 315/371
5,285,133 2/1994 Ogura .................................... 315/371

*Primary Examiner*—Gregory C. Issing
*Attorney, Agent, or Firm*—Ratner & Prestia

[57] ABSTRACT

A horizontal deflection circuit is provided which is useful in a television receiver and a video apparatus using a cathode ray tube, and which generates a deflection current for horizontally deflecting electron beams by changing a magnetic field applied to the cathode ray tube, and in which a resonance circuit using LC parts is not employed, and the vertical line distortion correction and the control of the horizontal deflection current in the multiscan are conducted by changing the duty ratios of switch elements, thereby simplifying the circuit configuration, and reducing the cost and the loss. [CONSTRUCTION] The horizontal deflection circuit has: a series circuit of first and second switch means and connected to positive and negative terminals of a DC power source; a series circuit of a horizontal deflection coil and a first capacitor and connected across the first switch means; control means for controlling closing and opening operations of the first and second switch means; and first and second diodes respectively connected across the first and second switch means. The control means controls the first and second switch means so that the first and second switch means are alternately closed and opened in synchronism with a horizontal synchronizing signal. The control means further controls the first and second switch means so that close and open periods of the first and second switch means are changed in synchronism with a vertical synchronizing signal. Accordingly, a horizontal deflection circuit which is simplified in configuration, miniturized, and reduced in cost and loss is obtained.

23 Claims, 12 Drawing Sheets

HORIZONTAL DEFLECTION CIRCUIT

BACKGROUND OF THE INVENTION

1. Field of the Invention

The invention relates to a horizontal deflection circuit which is useful in a television receiver and a video apparatus using a cathode ray tube, and which generates a deflection current for horizontally deflecting electron beams by changing a magnetic field applied to the cathode ray tube from a horizontal deflection coil.

2. Related Art of the Invention

Recently, a display screen of a video apparatus has been increased in size, widened, and flattened, and such an apparatus itself has been thinned. This increasingly requests a horizontal deflection circuit to conduct in a highly accurate manner various corrections of deflection angles of electron beams so as to comply with an increased deflection current and image distortion which are caused by an increased deflection angle. In such an apparatus, moreover, requirements of energy saving, cost reduction, and minituarization produce large problems in that the horizontal deflection circuit is requested to consume a reduced power, to decrease the number of components, and to be integrated.

Hereinafter, a prior art horizontal deflection circuit will be described.

FIG. 21 shows the configuration of a prior art horizontal deflection circuit. In FIG. 21, 1 designates an input voltage which supplies a DC voltage to input terminals 2 and 2'. The reference numerals 2 and 2' designate the input terminals which receive the DC voltage. The reference numeral 21 designates an inductance element which is connected in series to the input terminals 2 and 2' through a switch element 22, and excitation energy is charged into and discharged from the inductance element in accordance with the closing and opening operations of the switch element 22. The reference numeral 22 designates the switch element which is controlled by a driving circuit 20 to be turned on and off, and 20 designates the driving circuit which outputs a driving pulse for controlling the closing and opening operations of the switch element 22, in synchronism with an output of a horizontal synchronizing circuit 12 with a preset duty ratio. The reference numeral 12 designates the horizontal synchronizing circuit which detects a horizontal synchronizing signal from a video signal and outputs a horizontal synchronizing pulse, and 23 designates a capacitor which is connected across the switch element 22 and cooperates with the inductance element 21 to constitute a resonance circuit. A diode 24 is connected at its cathode to the junction of the switch element 22 and the inductance element 21, and at the anode to the cathode of a diode 25. The diode 25 is connected at the cathode to the diode 24 and at the anode to the input terminal 2', and cooperates with the diode 24 which is connected in series to the diode 24, so as to bypass the excitation current of the inductance element 21 and the deflection current of a horizontal deflection coil 10. The reference numeral 26 designates a capacitor which is connected across the diode 24, 27 designates a capacitor which is connected across the diode 25, 10 designates the horizontal deflection coil which is connected across the diode 24 through a capacitor 11, and 11 designates the capacitor which cooperates with the horizontal deflection coil 10 to constitute a resonance circuit, thereby changing the deflection current of the horizontal deflection coil 10 in an S-shape pattern. The reference numeral 28 designates an inductance element. One end of the inductance element is connected to the junction of the capacitors 27 and 26, the other end to the input terminal 2' through a capacitor 29. The reference numeral 29 designates the capacitor. The voltage across the capacitor is controlled by a parabola control circuit 30. The reference numeral 30 designates the parabola control circuit which controls the voltage across the capacitor 29 so as to have a preset voltage waveform in synchronism with an output of a vertical synchronizing circuit 13, and 13 designates the vertical synchronizing circuit which detects a vertical synchronizing signal from the video signal and outputs a synchronizing pulse.

The operation of the thus configured prior art horizontal deflection circuit will be described with reference to FIG. 22.

FIG. 22 is a waveform chart illustrating the operations of various portions of the horizontal deflection circuit of FIG. 21. In the figure, IL indicates the waveform of the deflection current flowing through the horizontal deflection coil 10, VQ1 indicates the waveform of the resonance voltage applied across the switch element 22, IQ1 indicates the waveform of the current flowing through the switch element 22, IS indicates the waveform of the current flowing through the diode 24, J indicates the waveform of the output of the driving circuit 20, VS indicates the waveform of the voltage across the capacitor 27, VC indicates the waveform of the voltage across the capacitor 29, D indicates the synchronizing pulse of the horizontal synchronizing circuit, E indicates the horizontal blanking interval, and F indicates the horizontal deflection interval.

When the switch element 22 is turned off in the horizontal blanking interval E by the driving circuit 20, the excitation current of the inductance element 21 which has flown during the on period of the switch element 22 causes the resonance voltage waveform VQ1 which depends mainly on the inductance of the inductance element 21 and the capacitance of the capacitor 23, to be generated across the capacitor 23, so that the excitation current is rapidly reduced. Then, the inductance element 21 is rapidly energized in the opposite direction. With using a general expression, the resonance period T in this case can be expressed as follows:

$$T = 2\pi \sqrt{L \times C} \qquad [\text{Ex. 1}]$$

The resonance period T is set so that a half of the resonance period T is within the horizontal blanking interval E. In the expression above, L is the inductance of the resonance circuit, and C is the capacitance. Similarly, the deflection current IL of the horizontal deflection coil 10 which has flown during the on period of the switch element 22 causes the resonance voltage waveform which depends on the capacitances of the capacitors 26 and 11 and the inductance of the horizontal deflection coil 10, to be generated, so that the deflection current IL of the horizontal deflection coil 10 is rapidly decreased and thereafter quickly raised in the opposite direction. In this case, since the capacitor 26 is sufficiently smaller than the capacitor 11, the most portion of the resonance voltage waveform generated in the above-mentioned resonance is applied across the capacitor 26. Furthermore, the resonance voltage waveform VS which depends of the capacitance of the capacitor 27 and the inductance of the inductance element 28 is generated across the capacitor 27, whereby the excitation current of the inductance element 28 which has been stored during the on period of the switch element 22 is rapidly reduced in the same manner as described above so that the excitation current in the opposite direction is increased. All the resonance circuits have the resonance periods calculated by (Ex. 1), and are matched so that the resonance periods substantially coincide with each other. Since the resonance voltage VQ1 appearing across the capacitor 23 is applied also to the series circuit of the capacitors 26 and 27, the addition voltage of a voltage VC26 across the capacitor 26 and the voltage VS across the capacitor 27 is equal to the resonance voltage VQ1 as follows:

$$VQ1=VC26+VS$$

When the resonance voltage VQ1 is reduced to be a zero voltage, the excitation current in the opposite direction of the inductance element 21 is regenerated to the input voltage 1 through the diodes 25 and 24, and the reverse excitation current is again reduced. At the same time, also the excitation current flowing through the horizontal deflection coil 10 in the opposite direction charges the capacitor 11 through the diode 24, and is again reduced. Furthermore, also the excitation current flowing through the inductance element 28 in the opposite direction is regenerated to the capacitor 29 through the diode 25, and again reduced.

When the switch element 22 is again turned on in the horizontal blanking interval E by the driving circuit 20, the excitation current in the opposite direction of the inductance element 21 is regenerated to the input voltage 1 through the switch element 22, and the reverse excitation current continues to be reduced. When all the excitation currents and the deflection current IL in the opposite direction of the inductance elements 21 and 28 and the horizontal deflection coil 10 are discharged to become zero currents, the input voltage 1 is applied through the switch element 22 to the inductance element 21 and the excitation current is supplied, so that the excitation energy is increased and accumulated. The voltage across the capacitor 11 is applied to the horizontal deflection coil 10 through the switch element 22 and the diode 25 and the deflection current is supplied, so that the excitation energy is increased and accumulated. The voltage across the capacitor 29 is applied to the inductance element 28 through the diode 24 and the switch element 22 and the excitation current is supplied, so that the excitation energy is accumulated. The excitation currents, and the deflection current continue to be increased until the horizontal deflection interval F is terminated, the horizontal blanking interval E is started and the switch element 22 is again turned off by the driving circuit 20. When the switch element 22 is turned off, the process is repeated with starting from the initial state. The driving circuit 20 continually drives the switch element 22 in synchronism with the video signal, in accordance with the horizontal synchronizing circuit 12 which detects the horizontal synchronizing signal from the video signal and outputs the horizontal synchronizing pulse. The deflection current which flows through the horizontal deflection coil 10 during the horizontal deflection interval F is set so that the deflection current waveform is caused to resonate by the horizontal deflection coil 10 and the capacitor 11. Since the deflection current generally forms an S-like shape, the correction is called the S-shape correction. The electron beams of the cathode ray tube are deflected in synchronism with the video signal by magnetic fluxes generated by the deflection current of the horizontal deflection coil 10. The S-shape deflection current IL is determined by the capacitance of the capacitor 11 and the inductance of the horizontal deflection coil 10, and its value is adjusted so as to comply with the properties of the cathode ray tube.

Next, the control operation of conducting the vertical line distortion correction by, in synchronism with the vertical deflection, changing the amplitude of the deflection current IL which flows through the horizontal deflection coil 10 will be described with reference to FIGS. 23 and 24. In FIGS. 23 and 24, the waveforms similar to those of FIG. 22 are identified by the same symbols, and their description is omitted. In FIG. 23, waveforms of various portions appearing when the voltage VC across the capacitor 29 is low are indicated by solid lines, and those appearing when the voltage VC across the capacitor 29 is high are indicated by broken lines. FIG. 24 in which the time axis is shortened shows the period of the vertical synchronization interval. In the figure, C indicates the vertical synchronizing pulse of the vertical synchronizing circuit 13, and G indicates the vertical synchronization interval of the video signal. It will be noted that, when the voltage across the capacitor 29 is controlled by the parabola control circuit 30, the amplitude of the deflection current IL of the horizontal deflection coil 10 changes in synchronism with the vertical synchronization interval. The parabola control circuit 30 is previously set by the vertical synchronizing circuit 13 which detects the vertical synchronizing signal of the video signal and outputs the vertical synchronizing pulse, so as to continually change the voltage across the capacitor 29 to become the parabolic voltage waveform VC in synchronism with the video signal. During the on period of the switch element 22, the voltage VC across the capacitor 29 is applied to the inductance element 28 through the switch element 22 and the diode 24, and the excitation current flows through the inductance element 28, so that the excitation energy is stored. When the switch element 22 is turned off and the off period starts, a resonance phenomenon occurs in the capacitor 27 and the inductance element 28, and the voltage VS across the capacitor 27 changes sinusoidally. When the voltage VC across the capacitor 29 changes, the excitation current which is stored in the inductance element 28 during the on period of the switch element 22 changes so that also the stored excitation energy changes. Consequently, also the sinusoidal voltage of the voltage VS across the capacitor 27 changes in proportion to the parabolic voltage waveform VC. During the off period of the switch element 22, at the same time, also the voltage VQ1 across the capacitor 23 resonates with the inductance element 21 to change sinusoidally, and also the voltage VC26 across the capacitor 26 resonates with the horizontal deflection coil 10 to change sinusoidally. The voltage VC26 across the capacitor 26 is the difference between the voltage VQ1 across the capacitor 23 and the voltage VS across the capacitor 27, and therefore changes in reverse proportion to the parabolic voltage waveform VC. The change of the voltage across the capacitor 26 causes the voltage applied to the horizontal deflection coil 10, to change, resulting in that also the deflection current IL of the horizontal deflection coil 10 similarly changes in reverse proportion to the parabolic voltage. This allows the deflection current IL of the horizontal deflection coil 10 which is generated during the on period of the switch element 22, to change in synchronism with the vertical deflection, whereby the so-called vertical line distortion correction is conducted.

Next, a prior art horizontal deflection circuit which is required to change the horizontal synchronizing signal in accordance with a video signal supplied to a display device or the like, or to comply with the so-called multiscan will be described.

FIG. 25 shows the configuration of the prior art horizontal deflection circuit. In FIG. 25, the same components as those of FIG. 21 are designated by the same reference numerals. Namely, 1 designates an input voltage, 2 and 2' designate input terminals, 10 designates a horizontal deflection coil, 11 designates a capacitor, 12 designates a horizontal synchronizing circuit, 13 designates a vertical synchronizing circuit, 20 designates a control circuit, 21 designates an inductance element, 22 designates a switch element, 23 designates a capacitor, 24 and 25 designate diodes, 26 and 27 designate capacitors, 28 designates an inductance element, 29 designates a capacitor, and 30 designates a parabola control circuit. These components have been described in detail in conjunction with FIG. 21, and therefore their detailed description is omitted. The reference numeral 40 designates voltage control means which is connected in series to the input terminal 2 and the inductance element 21. A control terminal of the voltage control means is connected to a voltage control circuit 46. The voltage control means converts the voltage of the input voltage 1 to a voltage of a predetermined level. The reference numeral 41 designates a capacitor which is connected to the junction of the voltage control means 40 and the inductance element 21 and also to the input terminal 2', and which smooths the voltage converted by the voltage control means 40. The reference numeral 42 designates a capacitor which is connected across the capacitor 23 through switch means 43, and which changes the capacitance of the capacitor 23 in response to the on/off operations of the switch means 43. The reference numerals 43 and 44 designate switch means the on/off operations of which are determined by the horizontal synchronizing frequency, and which sets the resonance conditions complying with the horizontal synchronizing frequency. The reference numeral 45 designates a capacitor which is connected across the capacitor 11 through the switch means 44, and which changes the capacitance of the capacitor 11 in response to the on/off operations of the switch means 44, and 46 designates the voltage control circuit which controls the voltage control means 40 so that the voltage previously set by the synchronizing pulse frequency of the horizontal synchronizing circuit 12 is obtained, thereby changing the voltage across the capacitor 41.

The operation of the thus configured horizontal deflection circuit will be described. As described in detail in conjunction with FIG. 21, the deflection current IL of the horizontal deflection coil 10 is generated by using the resonance phenomena of the inductance element 21 and the capacitor 23, the horizontal deflection coil 10, the capacitor 11 and the capacitor 26, and the inductance element 28 and the capacitor 27. The S-shape correction, and the vertical line distortion correction are conducted in the same manner also in the horizontal deflection circuit of FIG. 25. Therefore, their description is omitted. When the horizontal synchronizing frequency in the video signal changes, also the horizontal deflection interval F and the horizontal blanking interval E naturally change. In the case of using the above-mentioned resonance phenomena, therefore, also the resonance conditions must be made changeable so as to comply with the horizontal synchronizing frequency. Particularly, the resonance phenomena of the inductance element 21 and the capacitor 23, and the horizontal deflection coil 10 and the capacitor 11 which directly significantly affect the deflection current IL of the horizontal deflection coil 10 must change at least in accordance with the horizontal synchronizing frequency. The resonance frequencies must be caused to change in accordance with the horizontal synchronizing frequency, by turning on and off the switch means 43 and 44 so that the capacitors 42 and 45 are connected in parallel to or disconnected from the capacitors 23 and 11. In the case where the resonance frequencies must accurately correspond to the change of the horizontal deflecting frequency, naturally, the above-mentioned requirement is fulfilled by connecting in parallel or disconnecting a further increased number of capacitors and switches. Also the remaining resonance circuits are required to be designed so as to be changeable in a similar manner, and also the capacitors 26 and 27 must be provided with similar changing means, resulting in that many capacitors and switch means are required. This complicates the circuit. The inductances of the horizontal deflection coil 10 and the inductance element 21 cannot be changed. In order to maintain constant the deflection current IL of the horizontal deflection coil 10 irrespective of the change of the horizontal synchronizing frequency, therefore, the input voltage 1 applied to the horizontal deflection circuit must be changeable. This requires the voltage control means 40, the voltage control circuit 46, and the capacitor 41 to be added as the means for changing the input voltage. Generally, the relationship between a voltage V applied to an inductance L, a peak value IP of a current flowing through the inductance, and an application period TON is expressed by $$IP = (V/L)TON$$

From the above, it will easily be understood that the input voltage must be changeable.

In another prior art example, the vertical line distortion correction is conducted by changing a voltage applied to a horizontal deflection circuit. In some cases, this is added to the control of the voltage control means 40. However, a change of the control voltage produces a problem in that the charging and discharging time of the capacitor 41 is delayed, and the following property may be impaired. Therefore, such a prior art has a reduced range of applications.

In the above-mentioned circuits of the prior art, however, since a large number of resonance phenomena are used, the inductance elements 21 and 28, and the capacitors 23, 26 and 27 are required, and the frequency is fixed. Therefore, there arise problems such as that it is difficult to minituarize the parts, that the setting adjustment conducted in view of also variations and temperature characteristics of parts are inevitably required, and that the circuit is complicated and the cost and the size are increased. Furthermore, the voltage control using the parabola control circuit 30 is necessary, the loss caused by the control of making the voltage changeable is large, and also the circuit loss is large.

In order to comply with the multiscan, the resonance capacitance is changed so that the resonance frequency changes in accordance with the horizontal synchronizing frequency. The switch means 43 and 44, and the capacitors 42 and 45 must be added as the means for realizing such a change. Moreover, as means for making the input voltage changeable, the voltage control element 40, the voltage control means 46, and the capacitor 41 must be added. Therefore, the circuit configuration is further complicated, and the loss produced in the process of changing the voltage is increased, thereby producing problems of the complicated adjustment, the increased cost, the increased size, and the increased loss due to the means for making the input voltage changeable. When the resonance frequencies are to correspond to the horizontal deflecting frequency in a further highly accurate manner, moreover, there arise many problems such as that a further increased number of capacitors and switch means must be added.

SUMMARY OF THE INVENTION

The invention has been conducted in order to solve the above-mentioned problems of the prior art. It is an object of the invention to provide a horizontal deflection circuit which uses only a part of resonance phenomena, which can highly accurately conduct the parabola correction, and the control of the deflection current of a horizontal deflection coil by changing the duty ratio of a switch element, thereby simplifying a control circuit and allowing components to be configured as an IC(s) or a hybrid circuit(s), and which has a simple configuration, can be produced at a low cost, and produces a small loss.

In order to attain the object, the horizontal deflection circuit of the invention comprises: a series circuit of first and second switch means and connected to positive and negative terminals of a DC power source; a series circuit of a horizontal deflection coil and a first capacitor and connected across the first switch means; control means for controlling closing and opening operations of the first and second switch means; and first and second diodes respectively connected across the first and second switch means, wherein the control means controls the first and second switch means so that the first and second switch means are alternately closed and opened in synchronism with a horizontal synchronizing signal, and the control means further controls the first and second switch means so that close and open periods of the first and second switch means are changed in synchronism with a vertical synchronizing signal and in accordance with a correction signal which is previously set.

In order to attain the object, the horizontal deflection circuit of the invention comprises: a series circuit of first and second switch means and connected to positive and negative terminals of a DC power source; a series circuit of a horizontal deflection coil and a first capacitor and connected across the first switch means; control means for controlling closing and opening operations of the first and second switch means; first and second diodes respectively connected across the first and second switch means; and a series circuit of at least one third switch means and a fourth capacitor and connected across the first capacitor, wherein the third switch means is externally controlled to be closed and opened so as to correspond to a frequency change of a horizontal synchronizing signal, the control means controls the first and second switch means so that the first and second switch means are alternately closed and opened in synchronism with the horizontal synchronizing signal, the control means further controls the first and second switch means so that close and open periods of the first and second switch means are changed in synchronism with a vertical synchronizing signal and in accordance with a correction signal which is previously set, and the control means further controls the first and second switch means so that close and open periods of the first and second switch means are changed in accordance with the frequency change of the horizontal synchronizing signal.

In order to attain the object, the horizontal deflection circuit of the invention comprises: a series circuit of first switch means and second switch means and connected across a fifth capacitor; a series circuit of a horizontal deflection coil and a first capacitor and connected across the first switch means; control means for controlling closing and opening operations of the first and second switch means; and first and second diodes respectively connected across the first and second switch means, wherein the control means controls the first and second switch means so that the first and second switch means are alternately closed and opened in synchronism with a horizontal synchronizing signal, the control means further controls the first and second switch means so that close and open periods of the first and second switch means are changed in synchronism with a vertical synchronizing signal and in accordance with a correction signal which is previously set, a DC power source is connected to one of the first and second switch means through a third diode, a sixth capacitor, and a fourth diode, a fourth switch means which is closed and opened in synchronism with the first or second switch means is connected across a series circuit of the fourth diode and the sixth capacitor, and, when the fourth switch means is closed, a series circuit of the DC power source, the fourth switch means, and the sixth capacitor is connected in parallel across the fifth capacitor through a fifth diode.

According to the configuration, the peak value of the current of the horizontal deflection coil can be changed by changing the close and open periods of the first and second switch means in synchronism with the horizontal synchronizing signal. Therefore, the vertical line distortion correction can be conducted by changing the close and open periods in synchronism with the vertical synchronizing signal. The stabilization of the current of the horizontal deflection coil with respect to the input voltage variation can be conducted by detecting a variation of the input voltage, and changing the close and open periods. The stabilization of the current of the horizontal deflection coil with respect to a change of the frequency of the horizontal synchronizing signal in the multiscan can be conducted by detecting a change of the frequency of the horizontal synchronizing signal, and changing the close and open periods.

Furthermore, the horizontal deflection circuit generates a voltage which is boosted by two times as high as the voltage of the DC power source, by using the phenomenon in which a sum of the voltage stored in the sixth capacitor and that of the DC power source is generated. Even in the case where the DC power source outputs a low voltage, therefore, the horizontal deflection circuit can operate satisfactorily.

Figure 1:
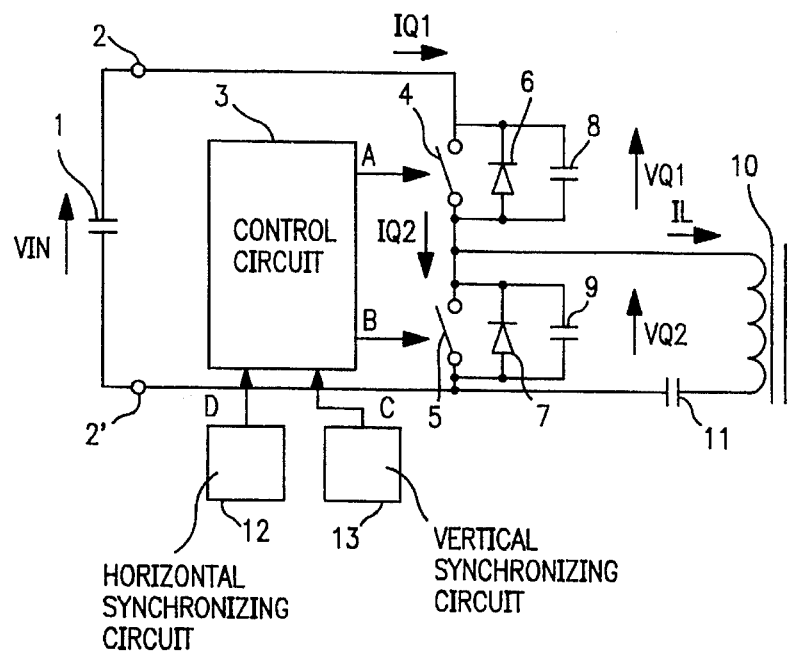
FIG. 1 is a circuit diagram of a horizontal deflection circuit which is a first embodiment of the invention.

LEGEND OF REFERENCE NUMERALS 1 input voltage
2 and 2' input terminals
3 control circuit
4, 5 switch elements
6, 7 diodes
8, 9 capacitors
10 horizontal deflection coil
11 capacitor
12 horizontal synchronizing circuit
13 vertical synchronizing circuit Preferred Embodiments Embodiment 1

Hereinafter, an embodiment of the invention will be described with reference to the drawings.

In FIG. 1, 1 designates an input voltage which supplies a DC voltage to input terminals 2 and 2'. The reference numerals 2 and 2' designate the input terminals, the terminal 2' is connected to the positive voltage, and the terminal 2' to the negative voltage so as to receive the DC voltage. The reference numeral 3 designates a control circuit which outputs an on/off driving pulse in accordance with outputs of a horizontal synchronizing circuit 12 and a vertical synchronizing circuit 13 with a preset duty ratio, thereby driving switch elements 4 and 5. The reference numeral 4 designates the switch element which is connected in series to the input terminals 2 and 2' through the switch element 5, and driven by the control circuit 3, 5 designates the switch element which is driven by the control circuit 3, and 6 designates a diode which is connected at its cathode to the junction of the input terminal 2, and at the anode to the junction of the switch elements 4 and 5, so as to bypass the deflection current IL of a horizontal deflection coil 10 during the off period of the switch element 4. The reference numeral 7 designates a diode which is connected at its cathode to the junction of the switch elements 4 and 5, and at the anode to the junction of the input terminal 2', so as to bypass the deflection current IL of the horizontal deflection coil 10 during the off period of the switch element 5. A capacitor 8 is connected across the switch element 4 to absorb a steep rising of the voltage appearing at a turn-off operation of the switch element 4, and a capacitor 9 is connected across the switch element 5 to absorb a steep rising of the voltage appearing at a turn-off operation of the switch element 5. The reference numeral 10 designates the horizontal deflection coil which is connected across the switch element 5 through a capacitor 11, and 11 designates the capacitor which cooperates with the horizontal deflection coil 10 to constitute a resonance circuit, thereby correcting the deflection current IL of the horizontal deflection coil 10 in an S-shape pattern. The reference numeral 12 designates the horizontal synchronizing circuit which detects a horizontal synchronizing signal from a video signal and outputs a horizontal synchronizing pulse to the control circuit 3, and 13 designates the vertical synchronizing circuit which detects a vertical synchronizing signal from the video signal and outputs a vertical synchronizing pulse to the control circuit 3.

Figure 2:
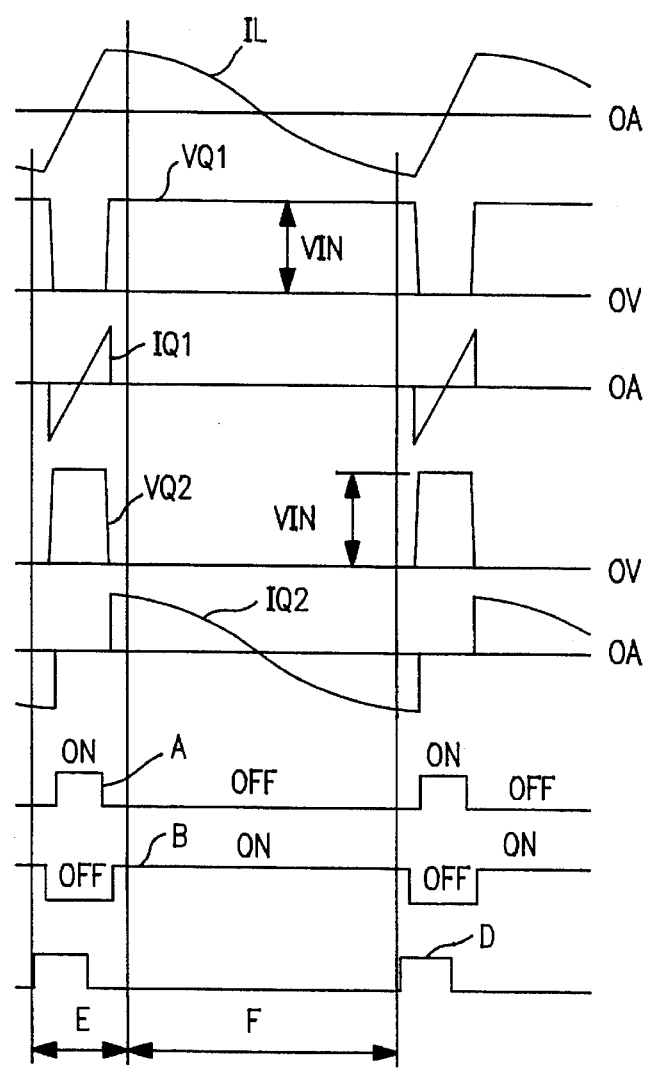
FIG. 2 is a waveform chart illustrating the operations of various portions of the horizontal deflection circuit of the first embodiment.

The operation of the thus configured horizontal deflection circuit will be described with reference to FIGS. 2, 3 and 4. FIG. 2 is a waveform chart illustrating the operations of various portions of the horizontal deflection circuit of FIG. 1. In the figure, IL indicates the waveform of the deflection current flowing through the horizontal deflection coil 10, VQ1 indicates the waveform of the voltage applied across the switch element 4, IQ1 indicates the waveform of the current flowing through the switch element 4, VQ2 indicates the waveform of the voltage applied across the switch element 5, IQ2 indicates the waveform of the current flowing through the switch element 5, A indicates the on/off driving pulse for driving the switch element 4 of the control circuit 3, B indicates the on/off driving pulse for driving the switch element 5 of the control circuit 3, D indicates the horizontal synchronizing pulse of the horizontal synchronizing circuit 12, E indicates the horizontal blanking interval, and F indicates the horizontal deflection interval. When the switch element 5 is turned off in the horizontal blanking interval E by the driving circuit 3, the excitation energy of the horizontal deflection coil 10 which has been stored during the on period of the switch element 5 causes the deflection current IL to rapidly charge the capacitor 9 and discharge the capacitor 8 so that the voltage across the switch element 5 is raised. The deflection current IL is then regenerated to the input voltage 1 through the capacitor 11 and the diode 6 and rapidly reduced. At this time, the switch element 4 is turned on by the driving circuit 3. Even when the current which is to flow through the diode 6 flows through the switch element 4, there arises no problem in operation. When the deflection current IL of the horizontal deflection coil 10 is reduced to a zero current, the difference between the input voltage 1 and the voltage across the capacitor 11 is applied to the horizontal deflection coil 10 through the switch element 4 which has already been turned on, so that the horizontal deflection coil 10 is reversely excited. While storing the excitation energy in the opposite direction, the deflection current IL is rapidly increased.

When the switch element 4 is then turned off in the horizontal blanking interval E by the driving circuit 3, the deflection current IL flowing through the horizontal deflection coil 10 in the opposite direction rapidly charges the capacitor 8 and discharges the capacitor 9 so that the voltage across the switch element 5 is lowered. Furthermore, the capacitor 11 is charged through the diode 7, thereby reducing the deflection current IL flowing in the opposite direction. At this time, the switch element 5 is again turned on by the driving circuit 3. Even when the current which is to flow through the diode 7 flows through the switch element 5, there arises no problem in operation. When the horizontal deflection interval F then starts and the deflection current IL in the opposite direction of the horizontal deflection coil 10 is reduced to a zero current, the voltage across the capacitor 11 is applied to the horizontal deflection coil 10 through the switch element 5 which has already been turned on, so that the horizontal deflection coil 10 is excited. While storing the excitation energy, the deflection current IL is rapidly increased. When the horizontal deflection interval F terminates and the horizontal blanking interval E starts, the switch element 5 is again turned off by the control circuit 3, and the initial state is repeated. The control circuit 3 continually drives the switch elements 4 and 5 so that the switch elements are alternately turned on and off during the horizontal blanking interval E in synchronism with the video signal and with a fixed dead time, in accordance with the horizontal synchronizing circuit 12 which detects the horizontal synchronizing signal from the video signal and outputs the horizontal synchronizing pulse. The deflection current IL which flows through the horizontal deflection coil 10 during the horizontal deflection interval F is set so that the deflection current waveform is caused to resonate by the horizontal deflection coil 10 and the capacitor 11. Since the deflection current forms an S-like shape, the correction is called the S-shape correction. The electron beams of the cathode ray tube are deflected in synchronism with the video signal by magnetic fluxes generated by the deflection current IL of the horizontal deflection coil 10. The S-shape deflection current IL is determined by the capacitance of the capacitor 11 and the inductance of the horizontal deflection coil, and its value is adjusted so as to comply with the properties of the cathode ray tube.

Next, the control operation of conducting the vertical line distortion correction by, in synchronism with the vertical deflection, changing the amplitude of the deflection current IL which flows through the horizontal deflection coil 10 will be described with reference to FIGS. 3 and 4. In FIGS. 3 and 4, the waveforms similar to those of FIG. 2 are identified by the same symbols, and their description is omitted. In FIG. 3, waveforms of various portions appearing when the on period of the switch element 4 is long are indicated by solid lines, and those appearing when the on period of the switch element 4 is short are indicated by broken lines. Since the on period of the switch element 4 is set so as to be within the period of the horizontal blanking interval E, also the on period of the switch element 5 has a fixed dead time, and the switch elements 4 and 5 are alternately turned on, naturally, the on period of the switch element 5 similarly changes in an opposite manner. FIG. 4 in which the time axis is shortened shows the period of the vertical synchronization interval. In the figure, C indicates the vertical synchronizing pulse of the vertical synchronizing circuit 13, and G indicates the vertical synchronization interval of the video signal. The control circuit 3 outputs on/off driving pulses A and B which are previously set, to the control terminals of the switch elements 4 and 5 in synchronism with the vertical synchronizing pulse C of the vertical synchronizing circuit 13. As described above, the change of the on period of the switch element 4 causes the application period of the difference between the input voltage 1 applied to the horizontal deflection coil 10 and the voltage across the capacitor 11, so that the excitation energy in the opposite direction which is stored in the horizontal deflection coil 10 is changed. Consequently, the deflection current IL of the horizontal deflection coil 10 can be changed. More specifically, the deflection current IL is increased by extending the on period of the switch element 4, and the deflection current IL is decreased by shortening the on period of the switch element 4. In this way, the vertical line distortion correction is conducted by changing the on period in a predetermined pattern so that the on/off outputs of the control circuit 3 attain the desired deflection current IL of the horizontal deflection coil 10 in synchronism with the output of the vertical synchronizing circuit 13. The on period of the switch element 4 must be changed in such a manner that, as shown in FIG. 3, the changeable amounts H of the on/off driving pulses of the control circuit 3 in the right and left sides about the center of the horizontal blanking interval E are equal to each other. Therefore, the positive and negative portions of the deflection current IL of the horizontal deflection coil 10 in the horizontal deflection interval F are made equal to each other, and the symmetry of the deflection angles in the right and left portions of the screen is maintained. It will easily be understood that, when the deflection angles in the right and left portions of the screen are to be different from each other, this can be coped with by changing the changeable amounts of the on/off driving pulses of the control circuit 3 in the right and left sides about the center of the horizontal blanking interval E so as to be different from each other. The switching loss in the on/off operations of the switch means 4 and 5 will be described. In the turn-on operation, the switch element 4 or 5 is turned on while the deflection current IL of the horizontal deflection coil 10 flows the diode 6 or 7 connected in parallel across the corresponding switch element, and hence turn-on loss is not produced. Namely, the turn-on operation constitutes the so-called zero-cross turn on. In the turn-off operation, the capacitors 8 and 9 connected across the switch elements 4 and 5 absorb or moderate the rising of the applied voltage at a turn-off operation of the respective switch element, whereby the turn-off loss can be reduced and the switching noise can be suppressed. Even when the capacitors 8 and 9 are sufficiently smaller than the capacitor 11, it is possible to attain sufficient effects. With respect to the resonance of the horizontal deflection coil 10 and the capacitor 11, the capacitors 8 and 9 may be set so as to have values which produce no problem in operation.

The thus configured horizontal deflection circuit of the embodiment will be compared with the prior art horizontal deflection circuit. In both the circuits, the S-shape correction of the deflection current IL of the horizontal deflection coil 10 is conducted in the same manner, or by using the resonance of the horizontal deflection coil 10 and the capacitor 11. In the embodiment, the excitation of the horizontal deflection coil 10 is conducted by directly applying the input voltage 1 through the switch element 4, and therefore the applied voltage has a rectangular waveform and a voltage higher than the input voltage 1 is not applied across the switch elements 4 and 5. This allows elements of a relatively low dielectric strength of about 800 V to be used as the switch elements 4 and 5 (in the prior art, a dielectric strength of 1,500 V is required). A voltage of about 700 V must be supplied as the input voltage 1 (in the prior art, about 140 V). Since the power consumption required for the fundamental horizontal deflection remains the same as that in the prior art, however, the capacity of the DC power source for supplying the input voltage 1 is unchanged. The vertical line distortion correction is conducted by means of a switching operation in which the on/off operations of the switch elements 4 and 5 are changed. Therefore, the loss is extremely reduced unlike the analog modulation conducted by the parabola control circuit 30 of the prior art which produces a large loss, and the changeable range of the deflection current IL of the horizontal deflection coil 10 can accurately be set in a wide range so that the PWM control can directly be done from a recent video signal digital processing circuit. This is very advantageous in precision and adjustment. In the prior art, many resonance circuits are used so that a very large number of parts which are relatively large, such as inductance elements and capacitors are used, whereby restrictions are imposed on the cost, shape and stability. By contrast, in the embodiment, parts which are configured by semiconductor parts such as switch elements are used in a relatively large number, so that, for example, the horizontal deflection circuit can be configured as a hybrid IC or a one-chip IC. Consequently, the embodiment is very advantageous in cost and shape.

Embodiment 2

Hereinafter, a second embodiment of the invention will be described with reference to the drawings.

Figure 5:
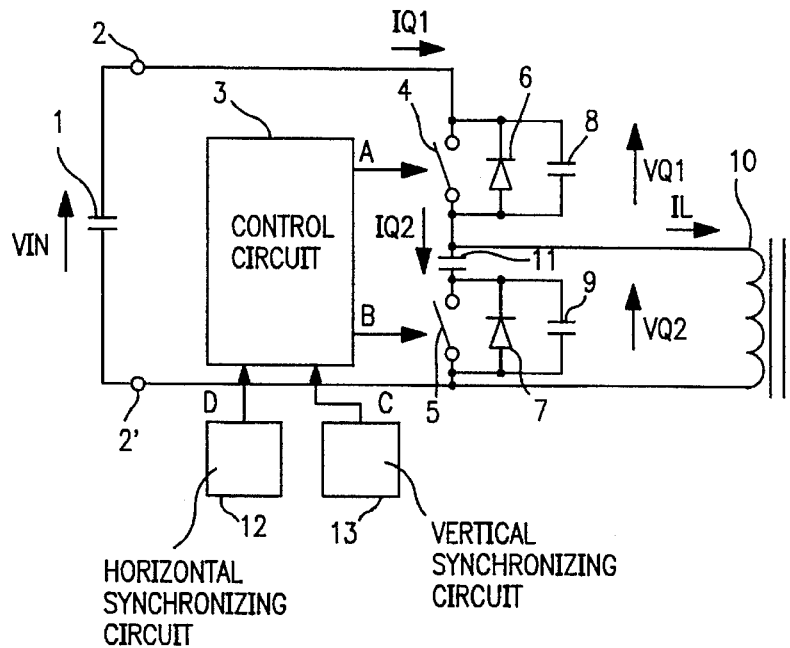
FIG. 5 is a circuit diagram of a horizontal deflection circuit which is a second embodiment of the invention.

In FIG. 5, 1 designates an input voltage, 2 and 2' designate input terminals, 3 designates a control circuit, 4 and 5 designate switch elements, 6 and 7 designate diodes, 8 and 9 designate capacitors, 10 designates a horizontal deflection coil, 12 designates a horizontal synchronizing circuit, and 13 designates a vertical synchronizing circuit. These components are configured in the same manner as those of FIG. 1. The embodiment is different from the configuration of FIG. 1 in that the capacitor 11 is connected between the junction of the switch element 4 and the horizontal deflection coil 10, and the switch element 5.

Figure 6:
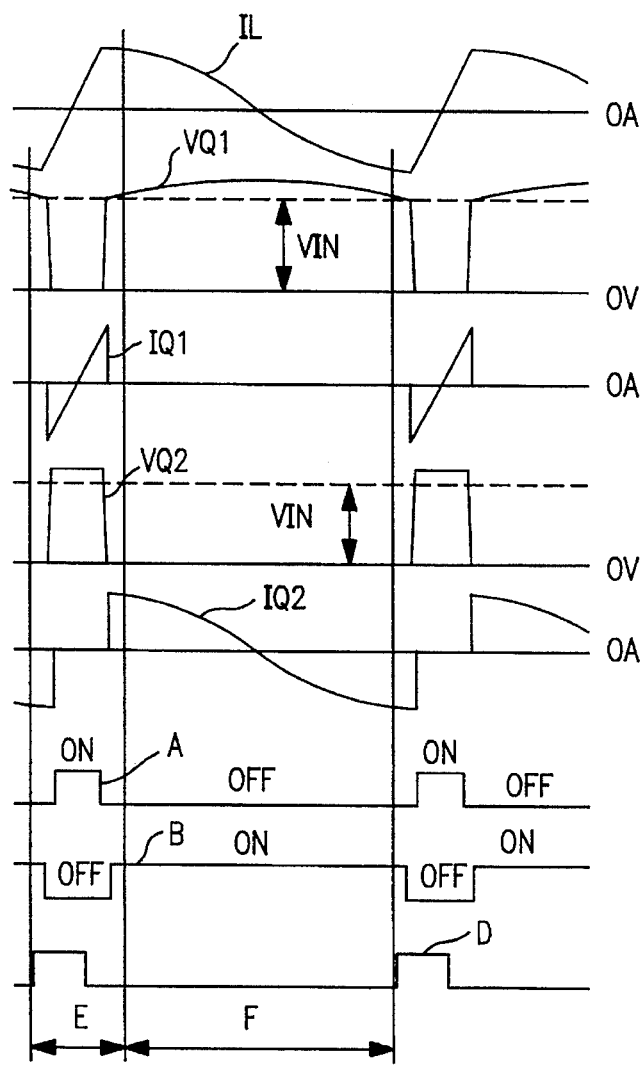
FIG. 6 is a waveform chart illustrating the operations of various portions of the horizontal deflection circuit of the second embodiment.

The operation of the thus configured horizontal deflection circuit will be described with reference to Fig. 6. FIG. 6 is a waveform chart illustrating the operations of various portions of the circuit of FIG. 5. In the figure, the waveforms similar to those of FIG. 2 are identified by the same symbols, and their description is omitted. When the switch element 5 is turned off in the horizontal blanking interval E by the driving circuit 3, the excitation energy of the horizontal deflection coil 10 which has been stored during the on period of the switch element 5 causes the deflection current IL to rapidly charge the capacitor 9 and discharge the capacitor 8 so that the voltage across the switch element 5 is raised. The deflection current IL is then regenerated to the input voltage 1 through the capacitor 11 and the diode 6 and rapidly reduced. At this time, the switch element 4 is turned on by the driving circuit 3. Even when the current which is to flow through the diode 6 flows through the switch element 4, there arises no problem in operation. When the deflection current IL of the horizontal deflection coil 10 is reduced to a zero current, the input voltage 1 is applied to the horizontal deflection coil 10 through the switch element 4 which has already been turned on, so that the horizontal deflection coil 10 is reversely excited. While storing the excitation energy in the opposite direction, the deflection current IL is rapidly increased. When the switch element 4 is then turned off in the horizontal blanking interval E by the driving circuit 3, the deflection current IL flowing through the horizontal deflection coil 10 in the opposite direction rapidly charges the capacitor 8 and discharges the capacitor 9 so that the voltage across the switch element 5 is lowered. Furthermore, the capacitor 11 is charged through the diode 7, thereby reducing the deflection current IL flowing in the opposite direction. At this time, the switch element 5 is again turned on by the driving circuit 3. Even when the current which is to flow through the diode 7 flows through the switch element 5, there arises no problem in operation. When the horizontal deflection interval F then starts and the deflection current IL in the opposite direction of the horizontal deflection coil 10 is reduced to a zero current, the voltage across the capacitor 11 is applied to the horizontal deflection coil 10 through the switch element 5 which has already been turned on, so that the horizontal deflection coil 10 is excited. While storing the excitation energy, the deflection current IL is rapidly increased. When the horizontal deflection interval F terminates and the horizontal blanking interval E starts, the switch element 5 is again turned off by the control circuit 3, and the initial state is repeated. The control circuit 3 continually drives the switch elements 4 and 5 so that the switch elements are alternately turned on and off during the horizontal blanking interval E in synchronism with the video signal and with a fixed dead time, in accordance with the horizontal synchronizing circuit 12 which detects the horizontal synchronizing signal from the video signal and outputs the horizontal synchronizing pulse. The deflection current IL which flows through the horizontal deflection coil 10 during the horizontal deflection interval F is set so that the deflection current waveform is caused to resonate by the horizontal deflection coil 10 and the capacitor 11. Since the deflection current forms an S-like shape, the correction is called the S-shape correction. The electron beams of the cathode ray tube are deflected in synchronism with the video signal by magnetic fluxes generated by the deflection current IL of the horizontal deflection coil 10. The S-shape deflection current IL is determined by the capacitance of the capacitor 11 and the inductance of the horizontal deflection coil, and its value is adjusted so as to comply with the properties of the cathode ray tube.

Figure 3:
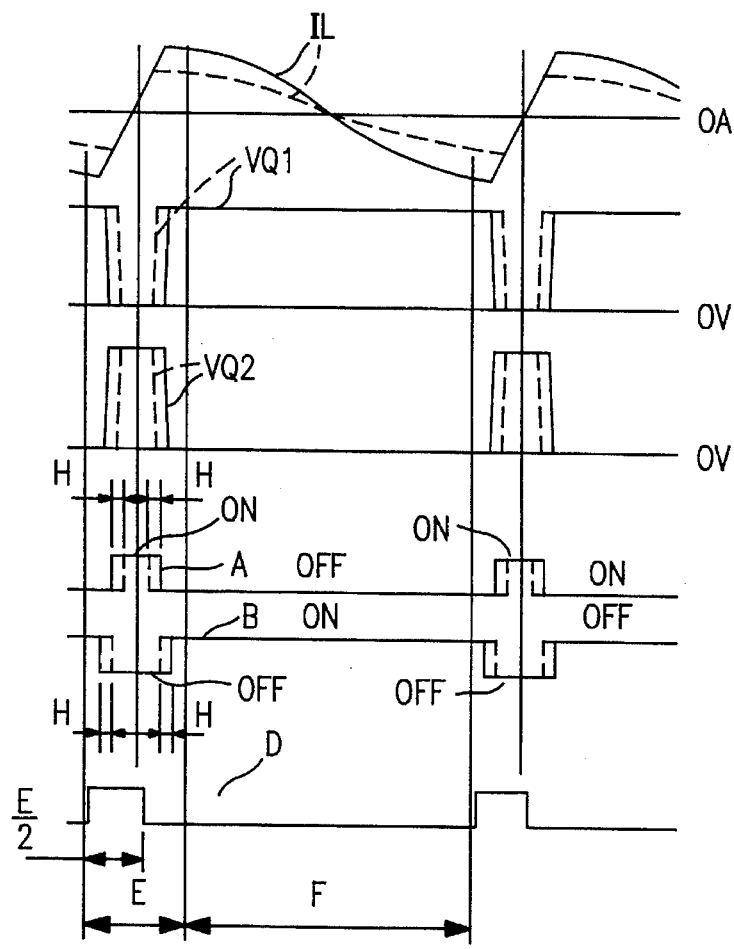
FIG. 3 is a waveform chart illustrating the operations of various portions of the horizontal deflection circuit of the first embodiment.
Figure 4:
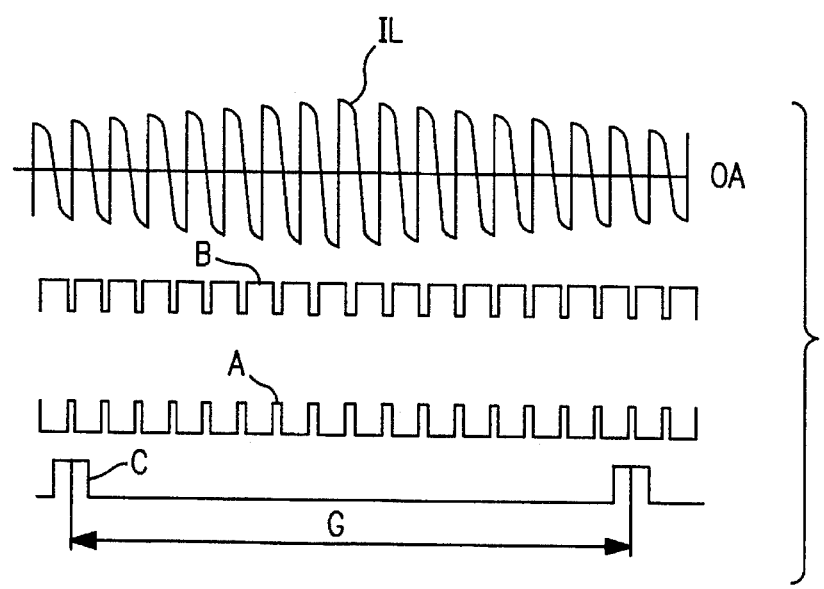
FIG. 4 is a waveform chart illustrating the operations of various portions of the horizontal deflection circuit of the first embodiment.

The control operation of conducting the vertical line distortion correction by, in synchronism with the vertical deflection, changing the amplitude of the deflection current IL which flows through the horizontal deflection coil 10 is the same as that which has been described in detail in conjunction with FIG. 1 and with reference to FIGS. 3 and 4, and hence its description is omitted.

The horizontal deflection circuit of the embodiment which has the configuration described above can attain the following effects in addition to those of the horizontal deflection circuit of the first embodiment of the invention. When the switch element 4 is turned on, the voltage VIN of the input voltage 1 is directly applied across the horizontal deflection coil 10, and hence the deflection current IL of the horizontal deflection coil 10 becomes steeper. Accordingly, an input voltage (about 600 V) which is lower than that used in the configuration of the first embodiment of the invention is sufficient for supplying the deflection current IL of the same level. This allows a rectifying and smoothing circuit for generating the input voltage 1, to have a low dielectric strength. Even when the switch elements 4 and 5 are simultaneously turned on by an accidental erroneous operation, the short-circuit current can be restricted by the capacitor 11, thereby increasing the reliability. Since the voltage across the capacitor 11 is superposed on the input voltage as shown in FIG. 6, however, the switch elements 4 and 5 must be switch elements which have the same dielectric strength (about 800 V) as that in the first embodiment of the invention.

Embodiment 3

Hereinafter, a third embodiment of the invention will be described with reference to the drawings.

Figure 7:
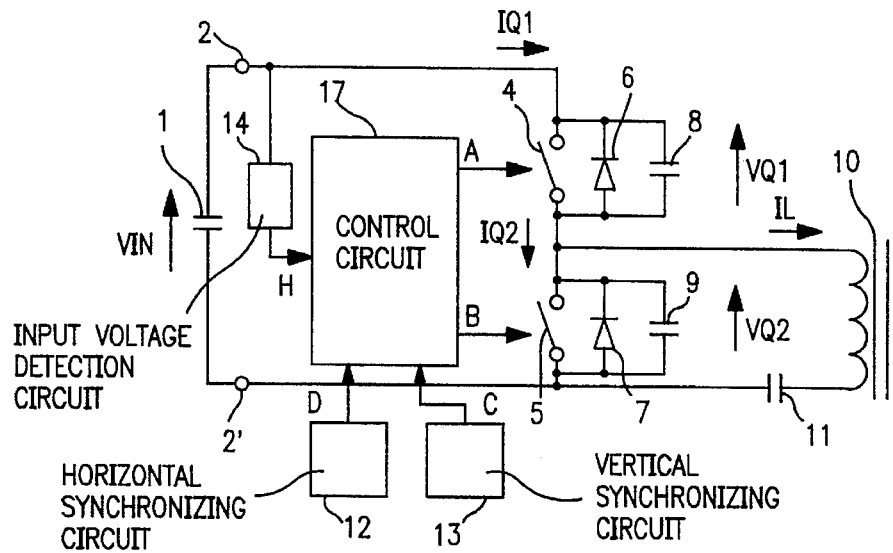
FIG. 7 is a circuit diagram of a horizontal deflection circuit which is a third embodiment of the invention.

In FIG. 7, 1 designates an input voltage, 2 and 2' designate input terminals, 4 and 5 designate switch elements, 6 and 7 designate diodes, 8 and 9 designate capacitors, 10 designates a horizontal deflection coil, 12 designates a horizontal synchronizing circuit, and 13 designates a vertical synchronizing circuit. These components are configured in the same manner as those of FIG. 1. The reference numeral 14 designates an input voltage detection circuit which detects the value of the input voltage and supplies information of the detected value to a control circuit 17, and 17 designates the control circuit which outputs an on/off driving pulse in accordance with outputs of the horizontal synchronizing circuit 12, the vertical synchronizing circuit 13, and the input voltage detection circuit 14, with a preset duty ratio, thereby driving the switch elements 4 and 5.

The operation of the thus configured horizontal deflection circuit will be described. As described in detail in conjunction with FIG. 1, during the on period of the switch element 4, the difference between the input voltage 1 and the voltage across the capacitor 11 is applied to the horizontal deflection coil 10 through the switch element 4, so that the deflection current IL reversely excites the horizontal deflection coil 10. During the on period of the switch element 5, the resonance of the horizontal deflection coil 10 and the capacitor 11 causes the deflection current IL of the horizontal deflection coil 10 to be subjected to the S-shape correction. The parabola correction is conducted by changing the on period of the switch element 4 in synchronism with the vertical synchronization interval in the same manner as that which has been described in detail in conjunction with FIG. 1 and with reference to FIGS. 3 and 4, and therefore its description is omitted. When the input voltage 1 is varied, the peak value of the deflection current IL of the horizontal deflection coil 10 is changed in proportion to the input variation because the inductance of the horizontal deflection coil 10 is constant. In order to maintain constant the peak value of the deflection current IL of the horizontal deflection coil 10 even when the input voltage 1 is varied, it is required to make the on periods of the switch elements 4 and 5 changeable. The relationship between the voltage VL applied to the inductance L10 of the horizontal deflection coil 10, the peak value ILP of the inductance current, and the on period TON of the switch element 4 is expressed by $$ILP=(VL/L10)TON$$

Also from this expression, it will easily be understood that the peak value of the deflection current IL of the horizontal deflection coil 10 can be maintained constant by making the on periods of the switch elements 4 and 5 changeable. The voltage VL is the difference between the input voltage 1 and the voltage across the capacitor 11. In the embodiment, therefore, the change of the on/off driving pulse which is previously set in the control circuit 17 is added to the change which is synchronized with the vertical synchronizing circuit 13, on the basis of the information of the output H of the input voltage detection circuit 14, thereby causing the on period TON of the switch element 4 to be changed in a follow-up manner. Even when the input voltage 1 is varied, therefore, the influence of the deflection current IL in the horizontal deflection interval F can be eliminated, with the result that it is not required to stabilize the input voltage 1.

The horizontal deflection circuit 6f the embodiment which has the configuration described above can attain the following effects in addition to those of the horizontal deflection circuit of the first embodiment of the invention. Since the stabilization of the input voltage 1 is not necessary, means for stabilizing the input voltage is not required so that the power source circuit constituting the input voltage 1 has a very simple configuration. Moreover, the loss which is produced in the stabilization of the input voltage 1 can be eliminated so that the power consumption of circuit is reduced.

Embodiment 4

Hereinafter, a fourth embodiment of the invention will be described with reference to the drawings.

Figure 8:
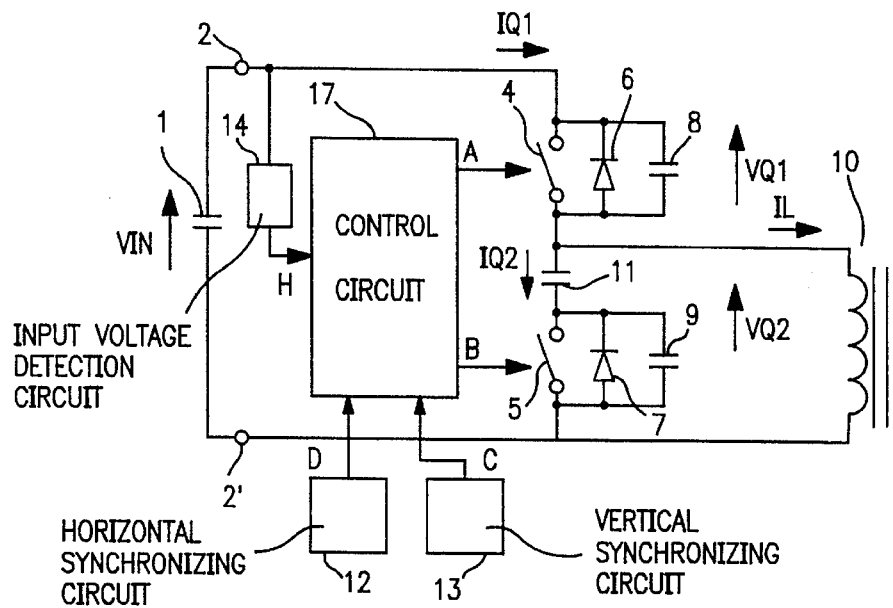
FIG. 8 is a circuit diagram of a horizontal deflection circuit which is a fourth embodiment of the invention.

In FIG. 8, 1 designates an input voltage, 2 and 2' designate input terminals, 4 and 5 designate switch elements, 6 and 7 designate diodes, 8 and 9 designate capacitors, 10 designates a horizontal deflection coil, 12 designates a horizontal synchronizing circuit, 13 designates a vertical synchronizing circuit, 14 designates an input voltage detection circuit, and 17 designates a control circuit. These components are configured in the same manner as those of FIG. 7. The embodiment is different from the configuration of FIG. 7 in that the capacitor 11 is connected between the junction of the switch element 4 and the horizontal deflection coil 10, and the switch element 5. The waveforms of the portions are the same as those of Fig. 6, and their description is omitted.

The operation of the thus configured horizontal deflection circuit will be described. As described in detail in conjunction with FIG. 5, during the on period of the switch element 4, the voltage across the input voltage 1 is applied to the horizontal deflection coil 10 through the switch element 4, so that the deflection current IL reversely excites the horizontal deflection coil 10. During the on period of the switch element 5, the resonance of the horizontal deflection coil 10 and the capacitor 11 causes the deflection current IL of the horizontal deflection coil 10 to be subjected to the S-shape correction. The parabola correction is conducted by changing the on period of the switch element 4 in synchronism with the vertical synchronization interval in the same manner as that which has been described in detail in conjunction with FIG. 1 and with reference to FIGS. 3 and 4, and therefore its description is omitted. When the input voltage 1 is varied, the peak value of the deflection current IL of the horizontal deflection coil 10 is changed in proportion to the input variation because the inductance of the horizontal deflection coil 10 is constant. In order to maintain constant the peak value of the deflection current IL of the horizontal deflection coil 10 even when the input voltage 1 is varied, it is required to make the on periods of the switch elements 4 and 5 changeable. The relationship between the voltage VL applied to the inductance L10 of the horizontal deflection coil 10, the peak value ILP of the inductance current, and the on period TON of the switch element 4 is expressed by $$ILP=(VL/L10)TON$$

Also from this expression, it will easily be understood that the peak value of the deflection current IL of the horizontal deflection coil 10 can be maintained constant by making the on periods of the switch elements 4 and 5 changeable. In the embodiment, therefore, the change of the on/off driving pulse which is previously set in the control circuit 17 is added to the change which is synchronized with the vertical synchronizing circuit 13, on the basis of the information of the output H of the input voltage detection circuit 14, thereby causing the on period TON of the switch element 4 to be changed in a follow-up manner. Even when the input voltage 1 is varied, therefore, the influence of the deflection current IL in the horizontal deflection interval F can be eliminated, with the result that it is not required to stabilize the input voltage 1.

The horizontal deflection circuit of the embodiment which has the configuration described above can attain the following effects in addition to those of the horizontal deflection circuit of the second embodiment of the invention. Since the stabilization of the input voltage 1 is not necessary, means for stabilizing the input voltage is not required so that the power source circuit constituting the input voltage 1 has a very simple configuration. Moreover, the loss which is produced in the stabilization of the input voltage 1 can be eliminated so that the power consumption of circuit is reduced.

Embodiment 5

Hereinafter, a fifth embodiment of the invention which is required to change the horizontal synchronizing frequency in accordance with a video signal supplied to a display device or the like, or to comply with the so-called multiscan will be described with reference to the drawings.

Figure 9:
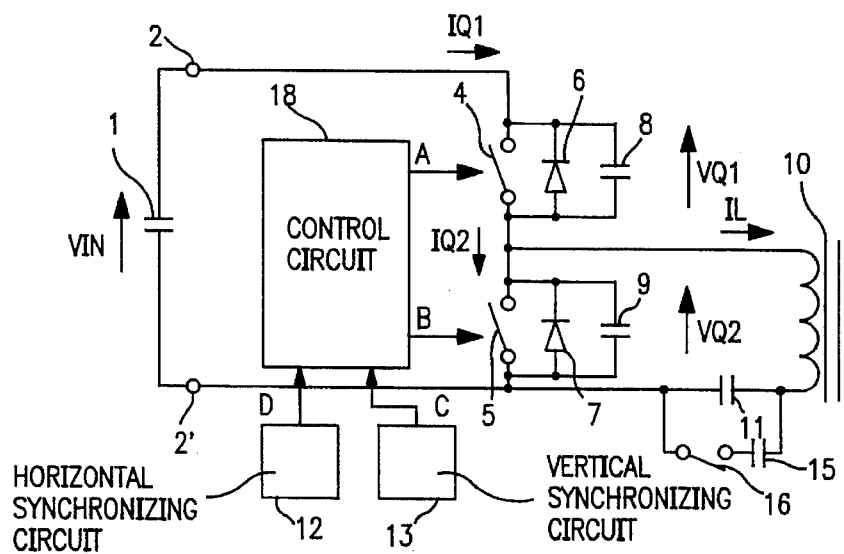
FIG. 9 is a circuit diagram of a horizontal deflection circuit which is a fifth embodiment of the invention.

In FIG. 9, 1 designates an input voltage, 2 and 2' designate input terminals, 4 and 5 designate switch elements, 6 and 7 designate diodes, 8 and 9 designate capacitors, 10 designates a horizontal deflection coil, 12 designates a horizontal synchronizing circuit, and 13 designates a vertical synchronizing circuit. These components are configured in the same manner as those of FIG. 1. The reference numeral 15 designates a capacitor which is connected across the capacitor 11 through switch means 16. The capacitance of the capacitor 11 is changed by turning on and off the switch means 16, whereby the resonance conditions are changed in order to make constant the S-shape correction due to a change of the horizontal synchronizing frequency. The reference numeral 16 designates the switch means the on/off operations of which are determined by the horizontal synchronizing frequency, and which sets the resonance conditions complying with the horizontal synchronizing frequency. The reference numeral 18 designates a control circuit which operates in accordance with the horizontal synchronizing circuit 12 and the vertical synchronizing circuit 13, and which detects a change of the horizontal synchronizing frequency and outputs an on/off driving pulse with a preset duty ratio, thereby driving the switch elements 4 and 5.

The operation of the thus configured horizontal deflection circuit will be described. As described in detail in conjunction with FIG. 1, during the on period of the switch element 4, the difference between the input voltage 1 and the voltage across the capacitor 11 is applied to the horizontal deflection coil 10 through the switch element 4, so that the deflection current IL reversely excites the horizontal deflection coil 10.

During the on period of the switch element 5, the resonance of the horizontal deflection coil 10 and the capacitor 11 causes the deflection current IL of the horizontal deflection coil 10 to be subjected to the S-shape correction. The parabola correction is conducted by changing the on period of the switch element 4 in synchronism with the vertical synchronization interval in the same manner as that which has been described in detail in conjunction with FIG. 1 and with reference to FIGS. 3 and 4, and therefore its description is omitted.

When the horizontal synchronizing frequency in the video signal changes, also the horizontal deflection interval F and the horizontal blanking interval E naturally change. In the case of using the above-mentioned resonance, therefore, also the resonance conditions of the horizontal deflection coil 10 and the capacitor 11 must be set changeable. Therefore, the resonance frequency is changed in accordance with the horizontal synchronizing frequency by turning on or off the switch means 16 so that the capacitor 15 is connected in parallel to the capacitor 11 or disconnected therefrom. In the case where the resonance frequency is to be changed more accurately in accordance with a change of the horizontal synchronizing frequency, this requirement is fulfilled in the same manner as the prior art example or by configuring the circuit so that a further increased number of capacitors are connected in parallel to or disconnected from the capacitor 11. The relationship between the voltage VL applied to the inductance L10 of the horizontal deflection coil 10, the peak value ILP of the inductance current, and the on period TON of the switch element 4 is expressed by $$ILP=(VL/L10)TON$$

When the voltage VL is constant, therefore, also the deflection current IL is kept constant. The voltage VL is the difference between the input voltage 1 and the voltage across the capacitor 11. When the horizontal synchronizing frequency is changed, however, also the horizontal blanking interval E is changed. The on period of the switch element 4 is previously set so as to be within the minimum horizontal blanking interval. Also the deflection current IL in the horizontal deflection interval F is affected by a change of the resonance conditions or increase of the horizontal blanking interval E as the horizontal syncronizing frequency becomes low. The maintenance of the deflection current IL in the horizontal deflection interval F at a constant level requires the peak value IP of the inductance current to be somewhat changed. It will easily be understood that the input voltage 1 to be applied to the horizontal deflection circuit or the on periods of the switch elements 4 and 5 must be made changeable. In the embodiment, therefore, a frequency change of the output D of the horizontal synchronizing circuit 12 is detected by the control circuit 18, and the change of the on/off driving pulse which is previously set is added to the change which is synchronized with the vertical synchronizing circuit 13, thereby causing the on period TON of the switch element 4 to be changed in a follow-up manner. The above-mentioned requirement can be fulfilled without requiring means for changing the input voltage 1. In this case, as the horizontal synchronizing frequency of a video signal becomes lower, the horizontal blanking interval E which is changed through the control circuit 18 by the horizontal synchronizing circuit 12 is further widened. Even when the horizontal synchronizing frequency is changed in a wide range, therefore, the on period of the switch element 4 the on period being controlled can sufficiently be obtained.

Figure 25:
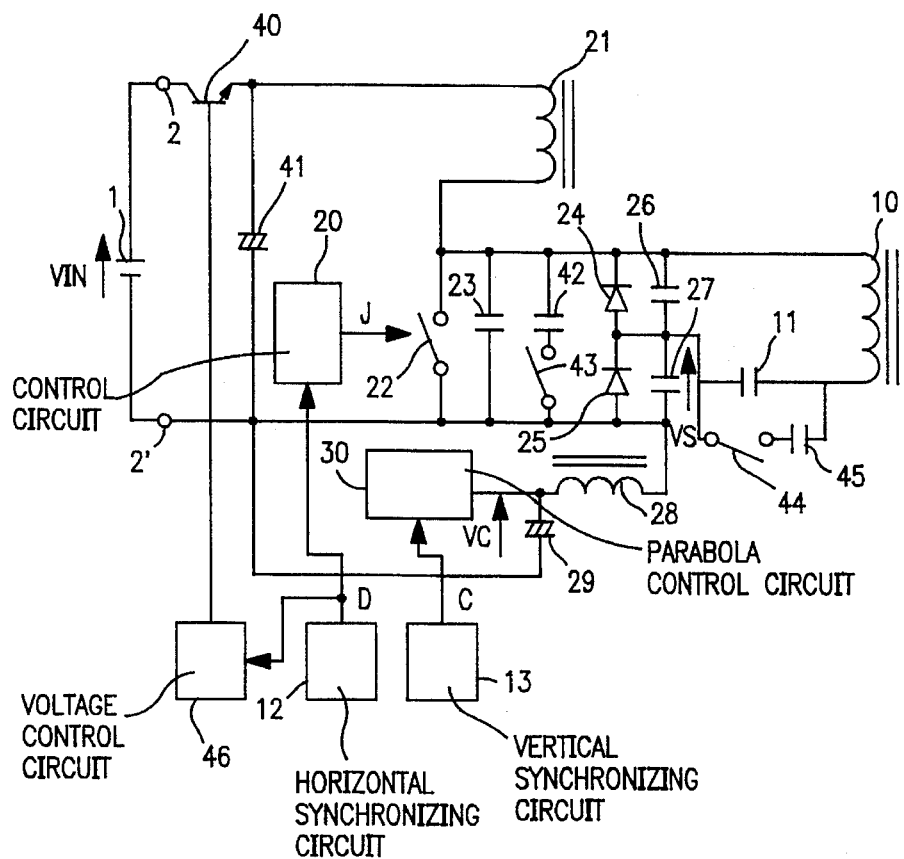
FIG. 25 is a circuit diagram of another prior art horizontal deflection circuit which conforms to the multiscan.

The horizontal deflection circuit of the embodiment which has the configuration described above can attain the following effects in addition to those of the horizontal deflection circuit of the first embodiment of the invention. As compared with the prior art horizontal deflection circuit conforming to the multiscan shown in FIG. 25, the horizontal deflection circuit of the embodiment is not required to change the input voltage 1, so that the means for changing the input voltage is not necessary, thereby allowing the power source circuit to have a very simple configuration. Moreover, the loss which is produced in the operation of changing the input voltage 1 is reduced so as to realize a low power consumption. Since the S-shape correction is conducted on the basis of a change of the horizontal synchronizing frequency, only means for switching the capacitance of the capacitor 11 is necessary for the purpose. Unlike the prior art, it is not required to simultaneously switch capacitors of many resonance circuits.

Embodiment 6

Hereinafter, a sixth embodiment of the invention will be described with reference to the drawings.

Figure 10:
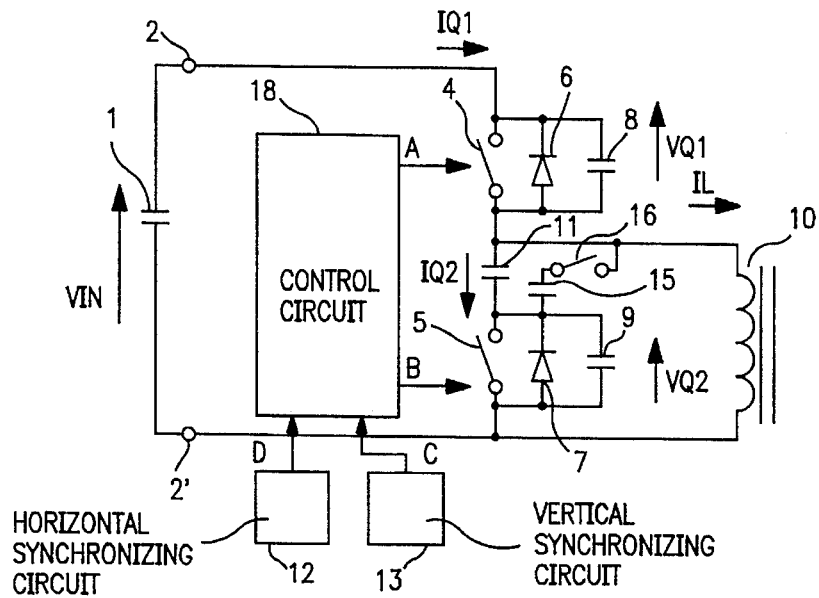
FIG. 10 is a circuit diagram of a horizontal deflection circuit which is a sixth embodiment of the invention.

In FIG. 10, 1 designates an input voltage, 2 and 2' designate input terminals, 4 and. 5 designate switch elements, 6 and 7 designate diodes, 8 and 9 designate capacitors, 10 designates a horizontal deflection coil, 12 designates a horizontal synchronizing circuit, 13 designates a vertical synchronizing circuit, 15 designates a capacitor, 16 designates switch means, and 18 designates a control circuit. These components are configured in the same manner as those of FIG. 9. The embodiment is different from the configuration of FIG. 9 in that a circuit consisting of the capacitors 11 and 15 and the switch means 16 is connected between the junction of the switch element 4 and the horizontal deflection coil 10, and the switch element 5.

The operation of the thus configured horizontal deflection circuit will be described. As described in detail in conjunction with FIG. 5, during the on period of the switch element 4, the voltage across the input voltage 1 is applied to the horizontal deflection coil 10 through the switch element 4, so that the deflection current IL reversely excites the horizontal deflection coil 10.

During the on period of the switch element 5, the resonance of the horizontal deflection coil 10 and the capacitor 11 causes the deflection current IL of the horizontal deflection coil 10 to be subjected to the S-shape correction. The parabola correction is conducted by changing the on period of the switch element 4 in synchronism with the vertical synchronization interval in the same manner as that which has been described in detail in conjunction with FIG. 1 and with reference to FIGS. 3 and 4, and therefore its description is omitted.

When the horizontal synchronizing frequency in the video signal changes, also the horizontal deflection interval F and the horizontal blanking interval E naturally change. In the case of using the above-mentioned resonance phenomena, therefore, also the resonance conditions of the horizontal deflection coil 10 and the capacitor 11 must be made changeable. Therefore, the resonance frequency is changed in accordance with the horizontal synchronizing frequency by turning on or off the switch means 16 so that the capacitor 15 is connected in parallel to the capacitor 11 or disconnected therefrom. In the case where the resonance frequency is to be changed more accurately in accordance with a change of the horizontal synchronizing frequency, this requirement is fulfilled in the same manner as the prior art example or by configuring the circuit so that a further increased number of capacitors are connected in parallel to or disconnected from the capacitor 11. The relationship between the voltage value VIN of the input voltage 1 applied to the inductance L10 of the horizontal deflection coil 10, the peak value ILP of the inductance current, and the on period TON of the switch element 4 is expressed by $$ILP = (VIN/L10)TON$$

When the input voltage 1 is constant, therefore, also the deflection current IL is kept constant. When the horizontal synchronizing frequency is changed, however, also the horizontal blanking interval E is changed. The on period of the switch element 4 is previously set so as to be within the minimum horizontal blanking interval. Also the deflection current IL in the horizontal deflection interval F is affected by a change of the resonance conditions or increase of the horizontal blanking interval E as the horizontal synchronizing frequency becomes low. The maintenance of the deflection current IL in the horizontal deflection interval F at a constant level requires the peak value IP of the inductance current to be somewhat changed. It will easily be understood that the input voltage to be applied to the horizontal deflection circuit or the on periods of the switch elements 4 and 5 must be made changeable. In the embodiment, therefore, a frequency change of the output D of the horizontal synchronizing circuit 12 is detected by the control circuit 18, and the change of the on/off driving pulse which is previously set is added to the change which is synchronized with the vertical synchronizing circuit 13, thereby causing the on period TON of the switch element 4 to be changed in a follow-up manner. Consequently, the above-mentioned requirement can be fulfilled without requiring means for changing the input voltage 1. In this case, as the horizontal synchronizing frequency of a video signal becomes lower, the horizontal blanking interval E which is changed through the control circuit 18 by the horizontal synchronizing circuit 12 is further widened. Even when the horizontal synchronizing frequency is changed in a wide range, therefore, the on period of the switch element 4 the on period being controlled can sufficiently be obtained.

The horizontal deflection circuit of the embodiment which has the configuration described above can attain the following effects in addition to those of the horizontal deflection circuit of the fifth embodiment of the invention. When the switch element 4 is turned on, the voltage VIN of the input voltage 1 is directly applied across the horizontal deflection coil 10, and hence the deflection current IL of the horizontal deflection coil 10 becomes steeper. Accordingly, an input voltage (about 600 V) which is lower than that used in the configuration of the prior art is sufficient for supplying the deflection current IL of the same level. This allows a rectifying and smoothing circuit for generating the input voltage 1, to have a low dielectric strength. Even when the switch elements 4 and 5 are simultaneously turned on by an accidental erroneous operation, the short-circuit current can be restricted by the parallel circuit of the capacitors 11 and 15, thereby increasing the reliability. Since the voltage across the capacitor 11 is superposed on the input voltage as shown in FIG. 6, however, the switch elements 4 and 5 must be switch elements which have the same dielectric strength (about 800 V) as that in the fifth embodiment of the invention. Even when the resonance conditions are changed in accordance with a change of the horizontal synchronizing frequency, moreover, the change of the resonance conditions does not affect the application voltage of the horizontal deflection coil 10 so that the circuit can cope more accurately with a wider change of the horizontal synchronizing frequency.

Embodiment 7

Hereinafter, a seventh embodiment of the invention will be described with reference to the drawings.

Figure 11:
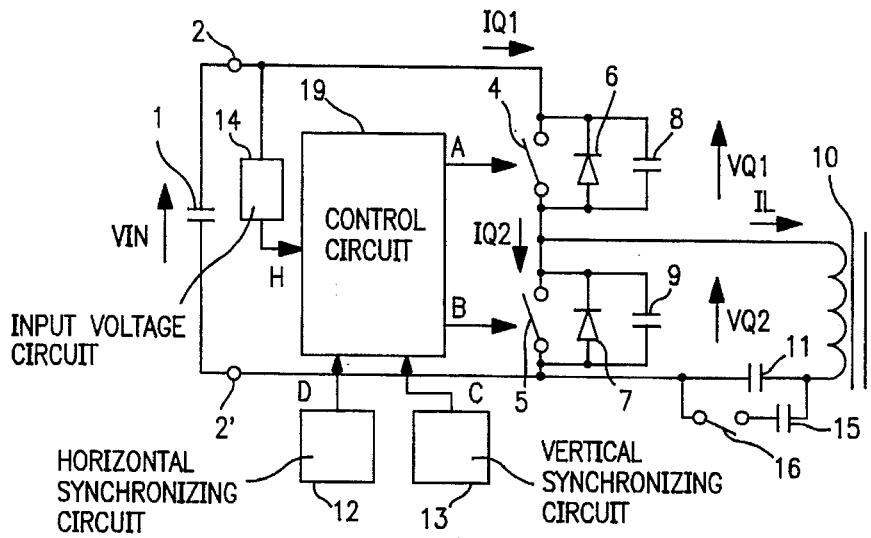
FIG. 11 is a circuit diagram of a horizontal deflection circuit which is a seventh embodiment of the invention.

In FIG. 11, 1 designates an input voltage, 2 and 2' designate input terminals, 4 and 5 designate switch elements, 6 and 7 designate diodes, 8 and 9 designates capacitors, 10 designates a horizontal deflection coil, 12 designates a horizontal synchronizing circuit, 13 designates a vertical synchronizing circuit, 15 designates a capacitor, and 16 designates switch means. These components are configured in the same manner as those of FIG. 9. The embodiment is different from the configuration of FIG. 9 in that the reference numeral 14 designates an input voltage detection circuit which detects the value of the input voltage 1 and supplies information of the detected value to a control circuit 19, and 19 designates the control circuit which detects a change of the horizontal synchronizing frequency and outputs an on/off driving pulse in accordance with the horizontal synchronizing circuit 12, the vertical synchronizing circuit 13, and the input voltage detection circuit 14, with a preset duty ratio, thereby driving the switch elements 4 and 5.

The operation of the thus configured horizontal deflection circuit will be described. As described in detail in conjunction with FIG. 1, during the on period of the switch element 4, the difference between the input voltage 1 and the voltage across the capacitor 11 is applied to the horizontal deflection coil 10 through the switch element 4, so that the deflection current IL reversely excites the horizontal deflection coil 10. During the on period of the switch element 5, the resonance of the horizontal deflection coil 10 and the capacitor 11 causes the deflection current IL of the horizontal deflection coil 10 to be subjected to the S-shape correction. The parabola correction is conducted by changing the on period of the switch element 4 in synchronism with the vertical synchronization interval in the same manner as that which has been described in detail in conjunction with FIG. 1 and with reference to FIGS. 3 and 4, and therefore its description is omitted. In the same manner as that which has been described in detail with reference to FIG. 9, a change of the horizontal synchronizing frequency can be coped by externally changing the capacitance of the capacitor 11 to change the resonance frequency, and the deflection current IL is controlled by changing the on period of the switch element 4. Therefore, the description of these operations is omitted.

In order to maintain constant the peak value of the deflection current IL of the horizontal deflection coil 10 even when the input voltage 1 is varied, it is required to make the on periods of the switch elements 4 and 5 changeable. The relationship between the voltage VL applied to the inductance L10 of the horizontal deflection coil 10, the peak value ILP of the inductance current, and the on period TON of the switch element 4 is expressed by $$ILP = (VL/L10)TON$$

Also from this expression, it will easily be understood that the peak value of the deflection current IL of the horizontal deflection coil 10 can be maintained constant by making the on periods of the switch elements 4 and 5 changeable. The voltage VL is the difference between the input voltage 1 and the voltage across the capacitor 11. In the embodiment, therefore, the change of the on/off driving pulse which is previously set in the control circuit 17 is added to the change which is synchronized with the vertical synchronizing circuit 13, on the basis of the information of the output H of the input voltage detection circuit 14, thereby causing the on period TON of the switch element 4 to be changed in a follow-up manner. Even when the input voltage 1 is varied, therefore, the influence of the deflection current IL in the horizontal deflection interval F can be eliminated not affected, with the result that it is not required to stabilize the input voltage 1.

The horizontal deflection circuit of the embodiment which has the configuration described above can attain the following effects in addition to those of the horizontal deflection circuit of the fifth embodiment of the invention. The change of the on/off driving pulse which is previously set in the control circuit 17 is added to the change which is synchronized with the vertical synchronizing circuit 13, on the basis of the information of the output H of the input voltage detection circuit 14, thereby causing the on period TON of the switch element 4 to be changed in a follow-up manner. Even when the input voltage 1 is varied, therefore, the deflection current IL in the horizontal deflection interval F is not affected, with the result that it is not required to stabilize the input voltage 1.

Embodiment 8

Hereinafter, an eighth embodiment of the invention will be described with reference to the drawings.

Figure 12:
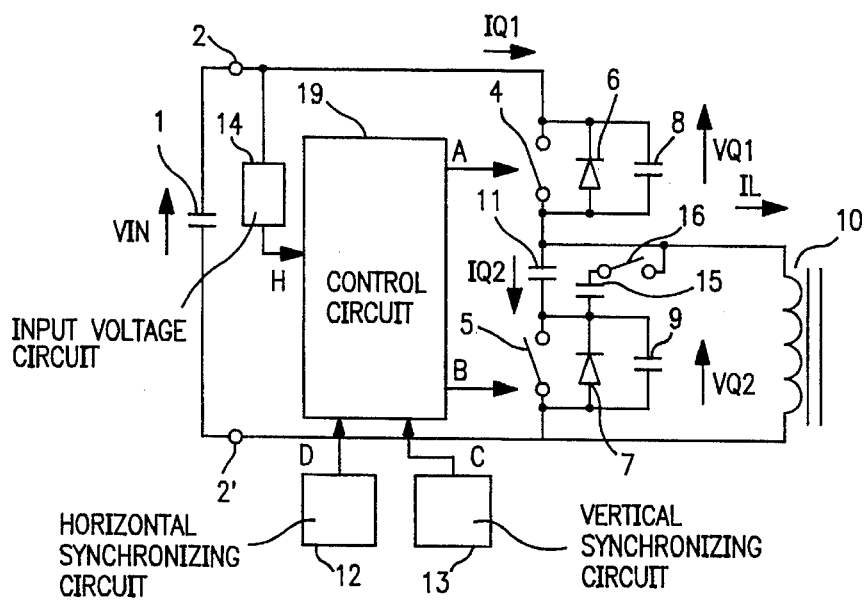
FIG. 12 is a circuit diagram of a horizontal deflection circuit which is an eighth embodiment of the invention.

In FIG. 12, 1 designates an input voltage, 2 and 2' designate input terminals, 4 and 5 designate switch elements, 6 and 7 designate diodes, 8 and 9 designate capacitors, 10 designates a horizontal deflection coil, 12 designates a horizontal synchronizing circuit, 13 designates a vertical synchronizing circuit, 15 designates a capacitor, and 16 designates switch means. These components are configured in the same manner as those of FIG. 10. The embodiment is different from the configuration of FIG. 10 in that the reference numeral 14 designates an input voltage detection circuit which detects the value of the input voltage 1 and supplies information of the detected value to a control circuit 19, and 19 designates the control circuit which detects a change of the horizontal synchronizing frequency and outputs an on/off driving pulse in accordance with the horizontal synchronizing circuit 12, the vertical synchronizing circuit 13, and the input voltage detection circuit 14, with a preset duty ratio, thereby driving the switch elements 4 and 5.

The operation of the thus configured horizontal deflection circuit will be described. As described in detail in conjunction with FIG. 5, during the on period of the switch element 4, the difference between the input voltage 1 and the voltage across the capacitor 11 is applied to the horizontal deflection coil 10 through the switch element 4, so that the deflection current IL reversely excites the horizontal deflection coil 10. During the on period of the switch element 5, the resonance of the horizontal deflection coil 10 and the capacitor 11 causes the deflection current IL of the horizontal deflection coil 10 to be subjected to the S-shape correction. The parabola correction is conducted by changing the on period of the switch element 4 in synchronism with the vertical synchronization interval in the same manner as that which has been described in detail in conjunction with FIG. 1 and with reference to FIGS. 3 and 4, and therefore its description is omitted. In the same manner as that which has been described in detail with reference to FIG. 10, a change of the horizontal synchronizing frequency can be coped by externally changing the capacitance of the capacitor 11 to change the resonance frequency, and the deflection current IL is controlled by changing the on period of the switch element 4. Therefore, the description of these operations is omitted.

When the input voltage 1 is varied, the peak value of the deflection current IL of the horizontal deflection coil 10 is changed in proportion to the input variation because the inductance of the horizontal deflection coil 10 is constant. In order to maintain constant the peak value of the deflection current IL of the horizontal deflection coil 10 even when the input voltage 1 is varied, it is required to make the on periods of the switch elements 4 and 5 changeable. The relationship between the voltage VIN of the input voltage 1 applied to the inductance L10 of the horizontal deflection coil 10, the peak value ILP of the inductance current, and the on period TON of the switch element 4 is expressed by

*ILP=(VIN/L10)TON*

Also from this expression, it will easily be understood that the peak value of the deflection current IL of the horizontal deflection coil 10 can be maintained constant by making the on periods of the switch elements 4 and 5 changeable. In the embodiment, therefore, the change of the on/off driving pulse which is previously set in the control circuit 17 is added to the change which is synchronized with the vertical synchronizing circuit 13, on the basis of the information of the output H of the input voltage detection circuit 14, thereby causing the on period TON of the switch element 4 to be changed in a follow-up manner. Even when the input voltage 1 is varied, therefore, the influence of the deflection current IL in the horizontal deflection interval F can be eliminated, with the result that it is not required to stabilize the input voltage 1.

The horizontal deflection circuit of the embodiment which has the configuration described above can attain the following effects in addition to those of the horizontal deflection circuit of the sixth embodiment of the invention. The change of the on/off driving pulse which is previously set in the control circuit 19 is added to the change which is synchronized with the vertical synchronizing circuit 13, on the basis of the information of the output H of the input voltage detection circuit 14, thereby causing the on period TON of the switch element 4 to be changed in a follow-up manner. Even when the input voltage 1 is varied, therefore, the deflection current IL in the horizontal deflection interval F is not affected, with the result that it is not required to stabilize the input voltage 1.

Embodiment 9

Hereinafter, a ninth embodiment of the invention will be described with reference to the drawings.

Figure 13:
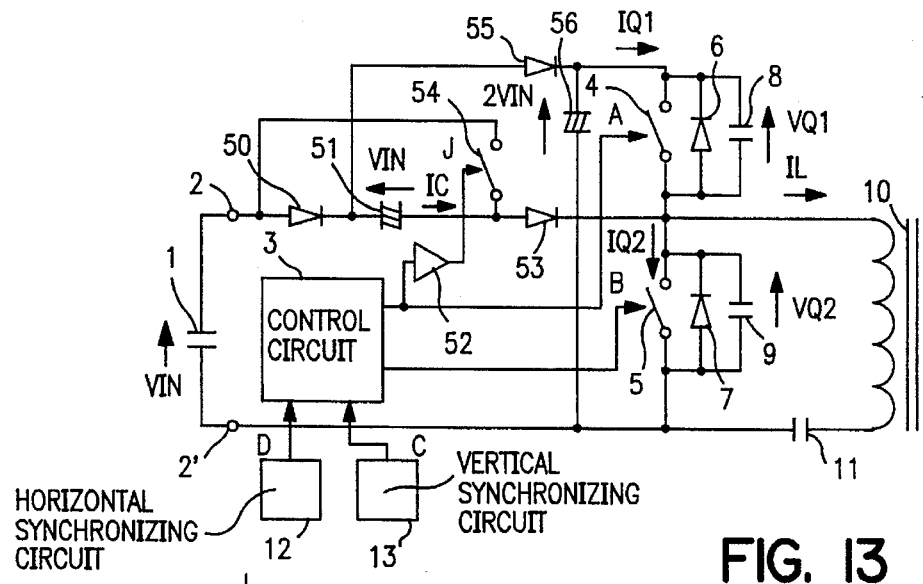
FIG. 13 is a circuit diagram of a horizontal deflection circuit which is a ninth embodiment of the invention.

In FIG. 13, 1 designates an input voltage which supplies a DC voltage to input terminals 2 and 2'. The reference numerals 2 and 2' designate the input terminals, the terminal 2 is connected to the positive voltage, and the terminal 2' to the negative voltage so as to receive the DC voltage. The reference numeral 3 designates a control circuit which outputs an on/off driving pulse in accordance with outputs of a horizontal synchronizing circuit 12 and a vertical synchronizing circuit 13 with a preset duty ratio, thereby driving switch elements 4 and 5. The reference numeral 4 designates the switch element which is connected in series to a capacitor 56 through the switch element 5, and driven by the control circuit 3, 5 designates the switch element which is driven by the control circuit 3, and 6 designates a diode which is connected at its cathode to the junction of the capacitor 56 and the switch element 4, and at the anode to the junction of the switch elements 4 and 5, so as to bypass the deflection current IL of a horizontal deflection coil 10 during the off period of the switch element 4. The reference numeral 7 designates a diode which is connected at its cathode to the junction of the switch elements 4 and 5, and at the anode to the junction of the input terminal 2', so as to bypass the deflection current IL of the horizontal deflection coil 10 during the off period of the switch element 5. A capacitor 8 is connected across the switch element 4 to absorb a steep rising of the voltage appearing at a turn-off operation of the switch element 4, and a capacitor 9 is connected across the switch element 5 to absorb a steep rising of the voltage appearing at a turn-off operation of the switch element 5. The reference numeral 10 designates the horizontal deflection coil which is connected across the switch element 5 through a capacitor 11, and 11 designates the capacitor which cooperates with the horizontal deflection coil 10 to constitute a resonance circuit, thereby correcting the deflection current IL of the horizontal deflection coil 10 in an S-shape pattern. The reference numeral 12 designates the horizontal synchronizing circuit which detects a horizontal synchronizing signal from a video signal and outputs a horizontal synchronizing pulse to the control circuit 3, and 13 designates the vertical synchronizing circuit which detects a vertical synchronizing signal from the video signal and outputs a vertical synchronizing pulse to the control circuit 3. The reference numeral 50 designates a diode which is connected at its anode to the input terminal 2, and at its cathode to the junction of the switch elements 4 and 5 through a capacitor 51 and a diode 53, 51 designates the capacitor, and 53 designates the diode which is connected at its cathode to the junction of the switch elements 4 and 5. When the switch element 5 is turned on, the input voltage 1 is applied to the capacitor 51 through the diodes 50 and 53, and the switch element 5. The reference numeral 52 designates a driving circuit which drives a switch element 54 in synchronism with the driving signal for the switch element 4 and output from the control circuit 3, and 54 designates the switch element one end of which is connected to the input terminal 2, and the other end of which is connected to the junction of the capacitor 51 and the diode 53. The on/off operation of the switch element 54 is driven by the driving circuit 52. The reference numeral 55 designates a diode which is connected at its anode to the junction of the diode 50 and the capacitor 51, and at its cathode to the input terminal 2' through a capacitor 56, and 56 designates the capacitor to which, when the switch element 54 is turned on, a sum of the input voltage 1 and the voltage across the capacitor 51 is applied to charge the capacitor.

The operation of the thus configured horizontal deflection circuit will be described with reference to Fig. 14.

Figure 14:
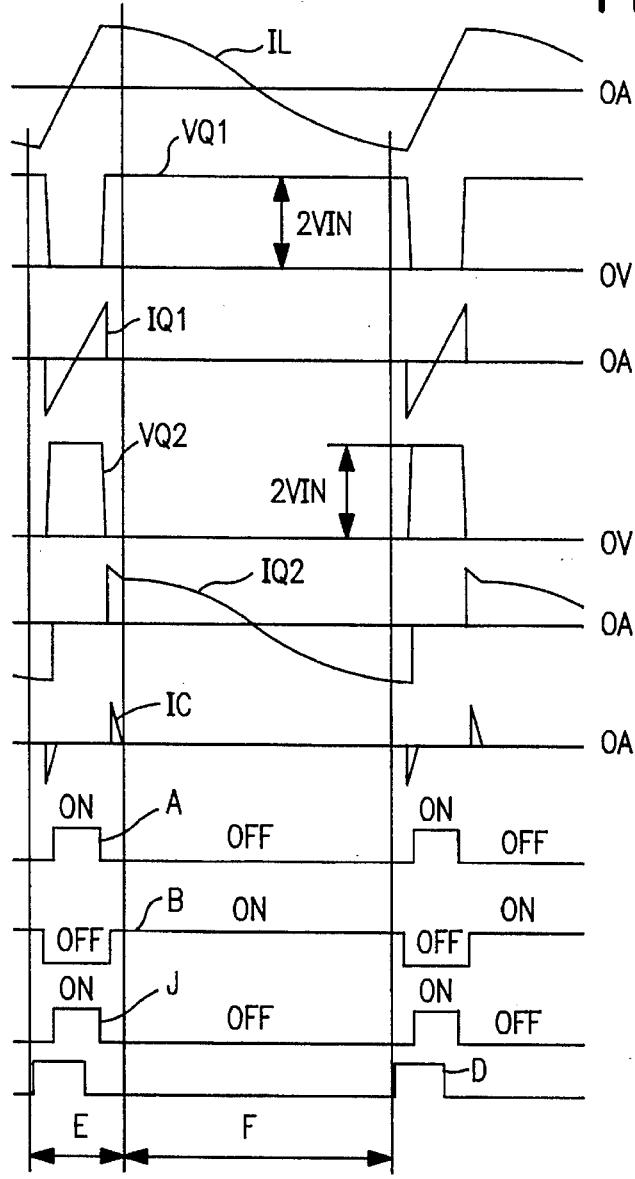
FIG. 14 is a waveform chart illustrating the operations of various portions of the horizontal deflection circuit of the ninth embodiment.

FIG. 14 is a waveform chart illustrating the operations of various portions of the horizontal deflection circuit of FIG. 13. In the figure, VQ1 indicates the waveform of the voltage applied across the switch element 4, IQ1 indicates the waveform of the current flowing through the switch element 4, VQ2 indicates the waveform of the voltage applied across the switch element 5, IQ2 indicates the waveform of the current flowing through the switch element 5, IC indicates the waveform of the current flowing through the capacitor 51, A indicates the on/off driving pulse for driving the switch element 4 of the control circuit 3, B indicates the on/off driving pulse for driving the switch element 5 of the control circuit 3, J indicates the on/off driving pulse fro driving the switch element 54, D indicates the synchronizing pulse of the horizontal synchronizing circuit 12, E indicates the horizontal blanking interval, and F indicates the horizontal deflection interval. Hereinafter, the operation will be described with dividing it into two portions, i.e., the operation of supplying a voltage to the capacitor 56 from the input voltage 1, and that of supplying the horizontal deflection current IL to the horizontal deflection coil 10.

First, the operation of supplying a voltage to the capacitor 56 from the input voltage 1 will be described. During a period when the switch element 5 is turned on by the control circuit 3 in the horizontal deflection interval F, a current is supplied from the input voltage 1 through the diode 50, the capacitor 51, the diode 53, and the switch element 5, so that a voltage VIN which is substantially equal to the input voltage 1 is stored across the capacitor 51. When the switch element 5 is turned off by the control circuit 3 in the horizontal blanking interval E, and the switch elements 4 and 54 are turned on respectively by the control circuit 3, and the driving circuit 52 which has received a signal from the control circuit 3, the input voltage 1 is applied to one terminal of the capacitor 51 through the switch element 54, and the other terminal of the capacitor is connected to the capacitor 56 through the diode 55. This constitutes a series connection of the input voltage 1 and the capacitor 51 so that a sum voltage of the two voltages, or a voltage 2VIN is applied to the capacitor 56 and a voltage which is substantially double the input voltage is stored in the capacitor 56. At the timing when the switch element 54 is turned on, the switch element 5 has already been turned off, and the voltage across the switch element 5 is rapidly raised by the horizontal deflection current IL which will be described later. Even when the switch element 54 is turned on, therefore, the current flowing through the switch element 54 is blocked by the diode 53 to be inhibited from flowing into portions other than the capacitor 51 to drive it. When the switch elements 4 and 54 are thereafter turned off respectively by the control circuit 3, and the driving circuit 52 which has received a signal from the control circuit 3, the voltage across the switch element 5 is rapidly lowered by the horizontal deflection current IL which will be described later. When the voltage across the switch element 5 becomes a zero voltage or the switch element is turned on, a current is again supplied from the input voltage 1 through the diode 50, the capacitor 51, the diode 53, and the switch element 5, so that the voltage VIN which is substantially equal to the input voltage 1 is stored across the capacitor 51. These operations are repeated so that the voltage 2VIN which is substantially double the input voltage 1 is continually held across the capacitor 56.

When the voltage across the capacitor 56 is regarded as the voltage across the input voltage 1 shown in FIG. 1, the operation of supplying the horizontal deflection current IL to the horizontal deflection coil 10 is the same as that which has been described in detail in conjunction with FIG. 1 and with reference to FIG. 2. Therefore, its description is omitted.

The control operation of conducting the vertical line distortion correction by, in synchronism with the vertical deflection, changing the amplitude of the deflection current IL which flows through the horizontal deflection coil 10 is the same as that which has been described in detail in conjunction with FIG. 1 and with reference to FIGS. 3 and 4, and hence its description is omitted.

The horizontal deflection circuit of the embodiment which has the configuration described above will be compared with the horizontal deflection circuit of the first embodiment of the invention. The S-shape correction of the deflection current IL of the horizontal deflection coil 10 is conducted in the same manner, or by using the resonance of the horizontal deflection coil 10 and the capacitor 11. In the embodiment, the horizontal deflection coil 10 is excited by directly applying the voltage across the capacitor 56 to the coil through the switch element 4, and therefore the applied voltage has a rectangular waveform and a voltage higher than the voltage across the capacitor 56 or a double of the input voltage 1 is not applied across the switch elements 4 and 5. This allows elements of a relatively low dielectric strength of about 800 V to be used as the switch elements 4 and 5 (in the prior art, a dielectric strength of 1,500 V is required). In the horizontal deflection circuit of the first embodiment of the invention, since the input voltage 1 is directly supplied to the switch element 4, a voltage as high as about 700 V is required as the input voltage 1 (in the prior art horizontal deflection circuit, a voltage of about 140 V can be used). According to the invention, although a voltage of about 700 V is required as the voltage across the capacitor 56, a voltage of about 350 V which is a half of the voltage across the capacitor 56 can be used as the input voltage 1. In the prior art horizontal deflection circuit, the vertical line distortion correction is conducted by means of a switching operation in which the on/off operations of the switch elements 4 and 5 are changed, and hence the loss is extremely reduced unlike the analog modulation conducted by the parabola control circuit 30 of the prior art which produces a large loss, and the changeable range of the deflection current IL of the horizontal deflection coil 10 can accurately be set in a wide range so that the PWM control can directly be done from a recent video signal digital processing circuit. This is very advantageous in precision and adjustment. As described above, the embodiment can attain also the effects same as those of the horizontal deflection circuit of the first embodiment of the invention.

Embodiment 10

Hereinafter, a tenth embodiment of the invention will be described with reference to the drawings.

Figure 15:
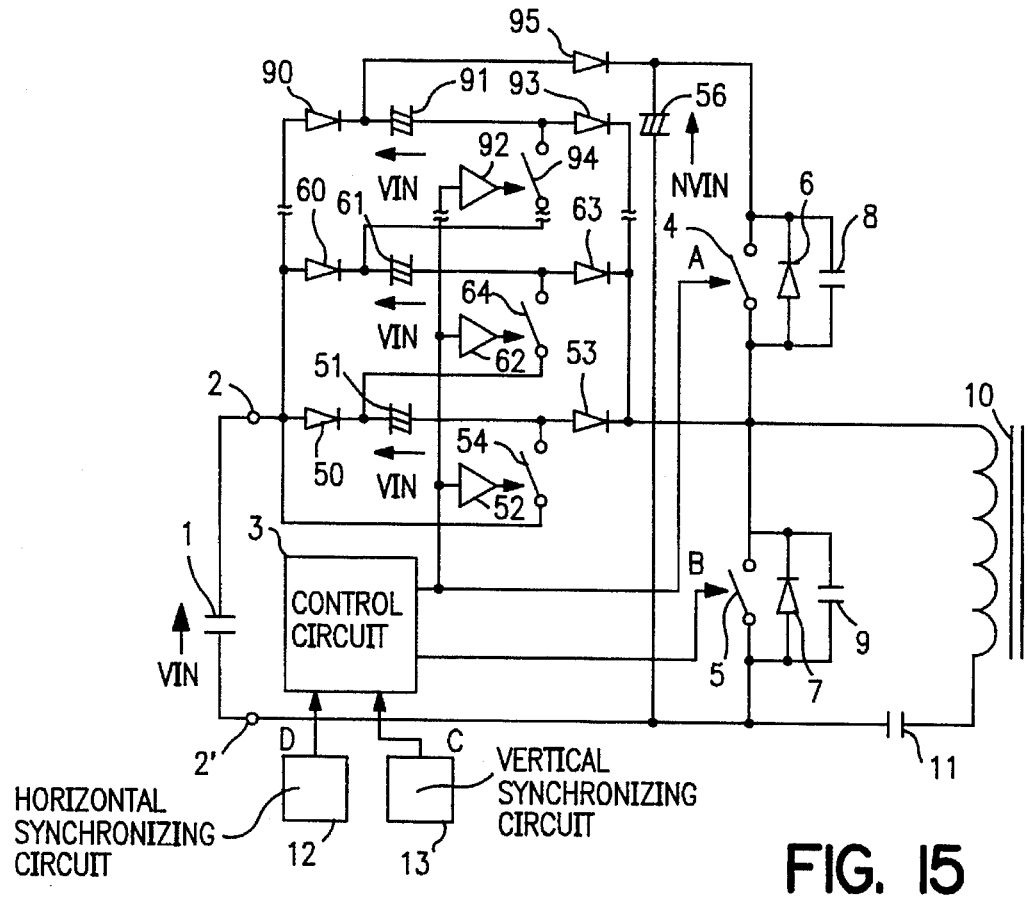
FIG. 15 is a circuit diagram of a horizontal deflection circuit which is a tenth embodiment of the invention.

In FIG. 15, 1 designates an input voltage, 2 and 2' designate input terminals, 3 designates a control circuit, 4 and 5 designate switch elements, 6 and 7 designate diodes, 8 and 9 designate capacitors, 10 designates a horizontal deflection coil, 12 designates a horizontal synchronizing circuit, 13 designates a vertical synchronizing circuit, 50 designates a diode, 51 designates a capacitor, 52 designates a driving circuit, 53 designates a diode, 54 designates a switch element, and 56 designates a capacitor. These components are configured in the same manner as those of FIG. 13. The embodiment is different from the configuration of FIG. 13 in the following points: A plurality of series circuits which are configured in the same manner by diodes 60 and 90, capacitors 61 and 91, diodes 63 and 93, etc. are connected in parallel to the series circuit of the diode 50, the capacitor 51, and the diode 53. Driving circuits 62 and 92 which operate in synchronism with the driving circuit 52, and switch elements 64 and 94 which are driven by the respective driving circuits are respectively connected to one terminal of the capacitor 51 and another terminal of the capacitor 61, and to the one terminal of the capacitor 61 and another terminal of the capacitor 91. In other words, the capacitors of the above-mentioned plural series circuits are connected in series through the switch elements. The one terminal of the capacitor 91 is connected to the capacitor 56 through a diode 95 so that a sum voltage of the series voltages of the capacitors of the above-mentioned plural series circuits, and the input voltage 1 is applied to the capacitor 56.

The operation of the thus configured horizontal deflection circuit will be described. First, the operation of supplying a voltage to the capacitor 56 from the input voltage 1 will be described. During a period when the switch element 5 is turned on by the control circuit 3 in the horizontal deflection interval F, a current is supplied from the input voltage 1 through the parallel circuit of plural series circuits which are respectively configured by the diodes 50, 60 and 90, the capacitors 51, 61 and 91, and the diodes 53, 63 and 93, and the switch element 5, so that a voltage VIN which is substantially equal to the input voltage 1 is stored across the capacitors 51, 61 and 91. The switch element 5 is turned off by the control circuit 3 in the horizontal blanking interval E. Thereafter, the switch element 4 is turned on respectively by the control circuit 3, and the switch elements 54, 64 and 94 are turned on by the driving circuits 52, 62 and 92 which have received a signal from the control circuit 3. The input voltage 1 is then applied to the one terminal of the capacitor 51 through the switch element 54, the other terminal of the capacitor 51 is connected to the capacitor 61 through the switch element 64, the other terminal of the capacitor 61 is connected to the capacitor 91 through the switch element 94, and the other terminal of the capacitor 91 is connected to the capacitor 56 through the switch element 95. Therefore, a sum voltage of the input voltage 1 and the voltages VIN across the capacitors 51, 61 and 91, or a voltage 4VIN is applied to the capacitor 56, and a voltage which is substantially quadruple the input voltage 1 is stored in the capacitor 56. At the timing when the switch elements 54, 64 and 94 are turned on, the switch element 5 has already been turned off, and the voltage across the switch element 5 is rapidly raised by the horizontal deflection current IL which has been described in conjunction with FIG. 13. Even when the switch elements 54, 64 and 94 are turned on, therefore, the currents flowing through the switch element 54, 64 and 94 are blocked by the diodes 53, 63 and 93 to be inhibited from flowing into portions other than the capacitors 51, 61 and 91 to drive them. When the switch elements 4, and 54, 64 and 94 are thereafter turned off respectively by the control circuit 3, and the driving circuits 52, 62 and 92 which have received a signal from the control circuit 3, the voltage across the switch element 5 is rapidly lowered by the horizontal deflection current IL which has been described in conjunction with FIG. 13. When the voltage across the switch element 5 becomes a zero voltage or the switch element is turned on, a current is again supplied from the input voltage 1 through the parallel circuit of the plural series circuits which are respectively configured by the diodes 50, 60 and 90, the capacitors 51, 61 and 91, and the diodes 53, 63 and 93, and the switch element 5, so that the voltage VIN which is substantially equal to the input voltage 1 is stored across the capacitors 51, 61 and 91. These operations are repeated so that the voltage 4VIN which is substantially quadruple the input voltage 1 is continually held across the capacitor 56. In the above, the embodiment in which three series circuits are connected has been described. The above-mentioned series circuits may be further added to the portions indicated by swung dashes in FIG. 15 so that an N number of series circuits are connected in total, thereby forming a configuration in which an N number of switch elements and an N number of driving circuits are connected in the manner described above. In this configuration, it will easily be understood that a voltage which is (N+1) times the input voltage is held in the capacitor 56.

The operation of supplying the horizontal deflection current IL to the horizontal deflection coil 10 is the same as that which has been described in detail in conjunction with FIG. 13, and therefore its description is omitted.

The horizontal deflection circuit of the embodiment which has the configuration described above can attain the following effects in addition to those of the horizontal deflection circuit of the ninth embodiment of the invention. In the embodiment, although a voltage of about 700 V is required as the voltage across the capacitor 56, a voltage of about 175 V or 700/(N+1) V which is one fourth or one (N+1)th of the voltage across the capacitor 56 can be used as the input voltage 1. Consequently, the input voltage can be lower than that used in the ninth embodiment of the invention, whereby the power source can be miniaturized and safety provisions such as the retainment of a safe distance can be relaxed.

Embodiment 11

Hereinafter, an eleventh embodiment of the invention will be described with reference to the drawings.

Figure 16:
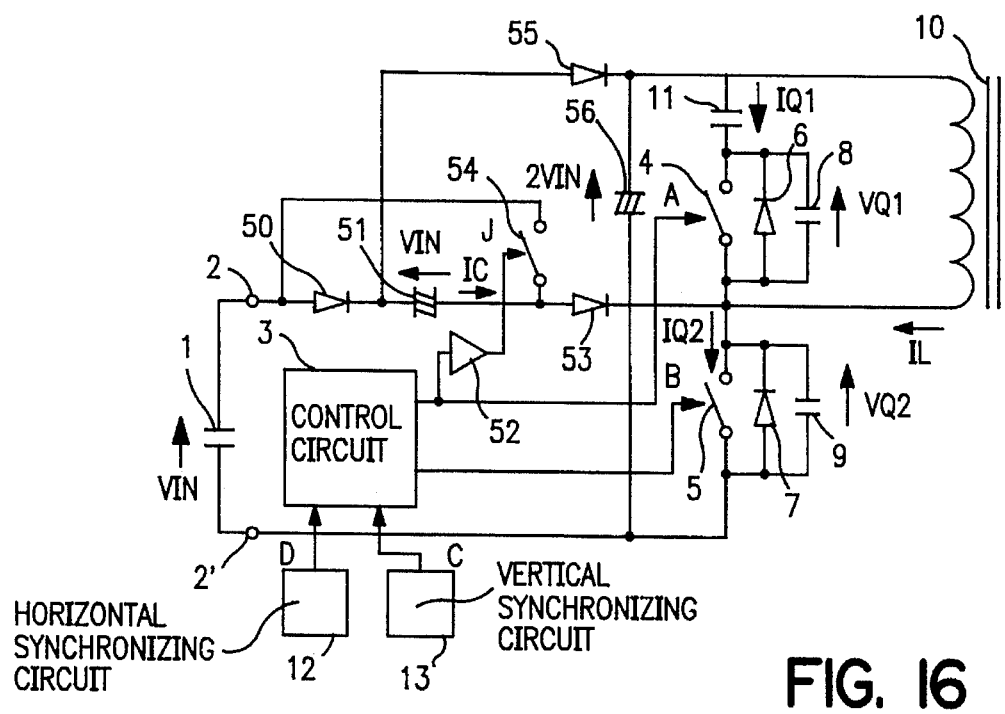
FIG. 16 is a circuit diagram of a horizontal deflection circuit which is an eleventh embodiment of the invention.

In FIG. 16, 1 designates an input voltage, 2 and 2' designate input terminals, 3 designates a control circuit, 4 and 5 designate switch elements, 6 and 7 designate diodes, 8 and 9 designate capacitors, 10 designates a horizontal deflection coil, 12 designates a horizontal synchronizing circuit, 13 designates a vertical synchronizing circuit, 50 designates a diode, 51 designates a capacitor, 52 designates a driving circuit, 53 designates a diode, 54 designates a switch element, and 56 designates a capacitor. These components are configured in the same manner as those of FIG. 13. The embodiment is different from the configuration of FIG. 13 in that the capacitor 11 is connected in series to the parallel circuit of the switch element 4, the diode 6, and the capacitor 8, that the horizontal deflection coil 10 is connected across the series circuit of the switch element 4 and the capacitor 11, and that the on/off driving pulse of the control circuit 3 is controlled in an opposite manner.

Figure 17:
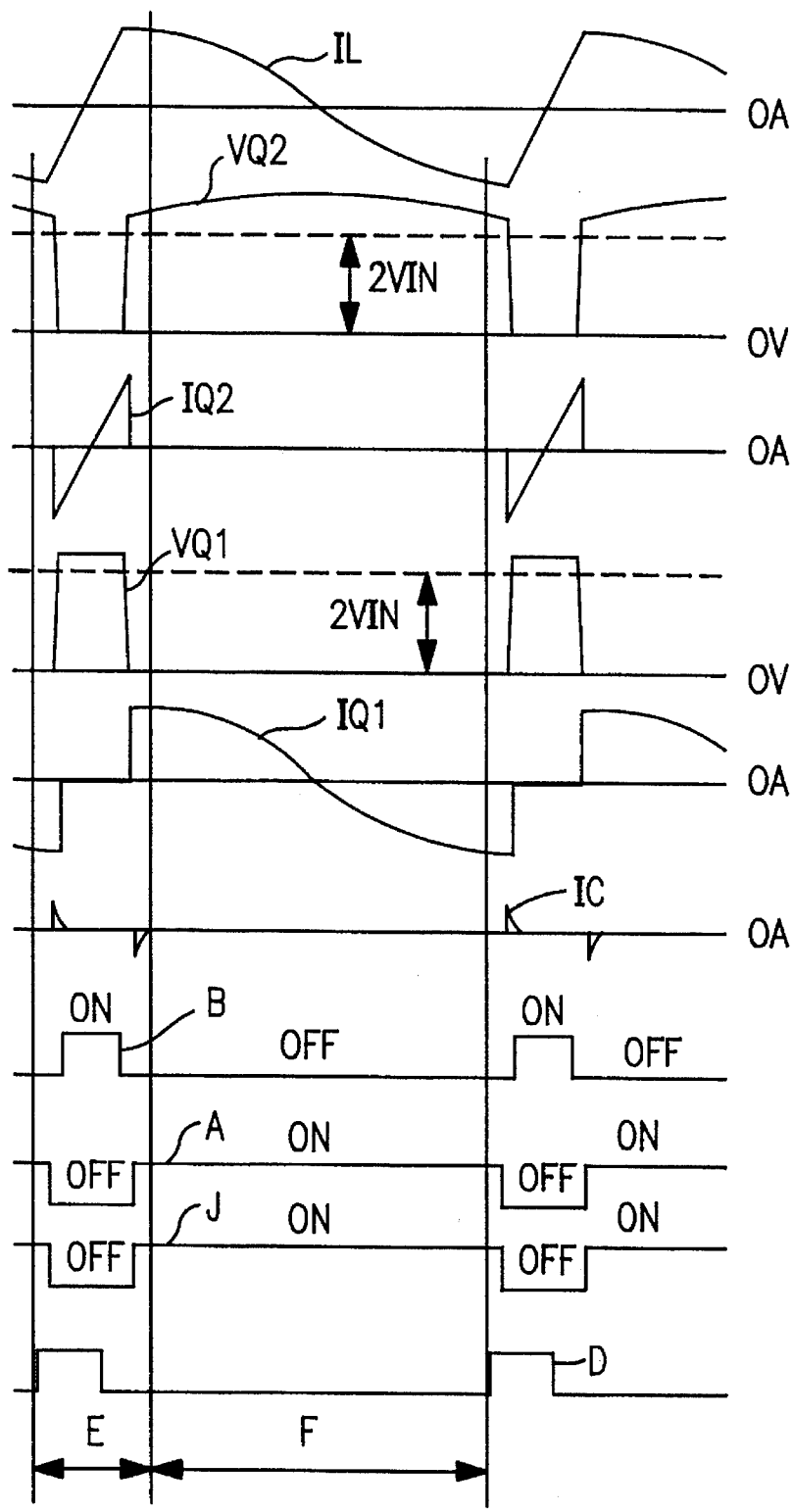
FIG. 17 is a waveform chart illustrating the operations of various portions of the horizontal deflection circuit of the eleventh embodiment.

The operation of the thus configured horizontal deflection circuit will be described with reference to FIG. 17. FIG. 17 is a waveform chart illustrating the operations of various portions of the horizontal deflection circuit of FIG. 16. In the figure, the waveforms similar to those of FIG. 14 are identified by the same symbols, and their description is omitted. Hereinafter, the operation will be described with dividing it into two portions, i.e., the operation of supplying a voltage to the capacitor 56 from the input voltage 1, and that of supplying the horizontal deflection current IL to the horizontal deflection coil 10.

The operation of supplying a voltage to the capacitor 56 from the input voltage 1 is the same as that which has been described in detail in conjunction with FIG. 13, and therefore its description is omitted.

Next, the operation of supplying the horizontal deflection current IL to the horizontal deflection coil 10 will be described. During a period when the switch element 4 is turned off by the control circuit 3 in the horizontal blanking interval E, the excitation energy of the horizontal deflection coil 10 which has been stored during the on period of the switch element 4 causes the deflection current IL to rapidly charge the capacitor 8 and discharge the capacitor 9 so that the voltage across the switch element 5 is lowered. The deflection current IL is then regenerated to the capacitor 56 through the diode 7 and rapidly reduced. At this time, the switch element 5 is turned on by the driving circuit 3. Even when the current which is to flow through the diode 7 flows through the switch element 5, there arises no problem in operation. When the deflection current IL of the horizontal deflection coil 10 is reduced to a zero current, the voltage across the capacitor 56 is applied to the horizontal deflection coil 10 through the switch element 5 which has already been turned on, so that the horizontal deflection coil 10 is reversely excited. While storing the excitation energy in the opposite direction, the deflection current IL is rapidly increased. When the switch element 5 is then turned off in the horizontal blanking interval E by the driving circuit 3, the deflection current IL flowing through the horizontal deflection coil 10 in the opposite direction rapidly charges the capacitor 9 and discharges the capacitor 8 so that the voltage across the switch element 4 is lowered. Furthermore, the capacitor 11 is charged through the diode 6, thereby reducing the deflection current IL flowing in the opposite direction. At this time, the switch element 4 is again turned on by the driving circuit 3. Even when the current which is to flow through the diode 6 flows through the switch element 4, there arises no problem in operation. When the horizontal deflection interval F then starts and the deflection current IL in the opposite direction of the horizontal deflection coil 10 is reduced to a zero current, the voltage across the capacitor 11 is applied to the horizontal deflection coil 10 through the switch element 4 which has already been turned on, so that the horizontal deflection coil 10 is excited. While storing the excitation energy, the deflection current IL is rapidly increased. When the horizontal deflection interval F terminates and the horizontal blanking interval E starts, the switch element 4 is again turned off by the control circuit 3, and the initial state is repeated. The control circuit 3 continually drives the switch elements 4 and 5 so that the switch elements are alternately turned on and off during the horizontal blanking interval E in synchronism with the video signal and with a fixed dead time, in accordance with the horizontal synchronizing circuit 12 which detects the horizontal synchronizing signal from the video signal and outputs the horizontal synchronizing pulse. The deflection current IL which flows through the horizontal deflection coil 10 during the horizontal deflection interval F is set so that the deflection current waveform is caused to resonate by the horizontal deflection coil 10 and the capacitor 11. Since the deflection current forms an S-like shape, the correction is called the S-shape correction. The electron beams of the cathode ray tube are deflected in synchronism with the video signal by magnetic fluxes generated by the deflection current IL of the horizontal deflection coil 10. The S-shape deflection current IL is determined by the capacitance of the capacitor 11 and the inductance of the horizontal deflection coil 10, and its value is adjusted so as to comply with the properties of the cathode ray tube. The circuit configuration is different from that of FIG. 5 in the series connection of the capacitor 11, and the switch elements 4 and 5, and also in the inversion of the operations of the switch elements 4 and 5. However, it will easily be understood that the operation is the same. The control operation of conducting the vertical line distortion correction by, in synchronism with the vertical deflection, changing the amplitude of the deflection current IL which flows through the horizontal deflection coil 10 is the same as that which has been described in detail in conjunction with FIG. 1 and with reference to FIGS. 3 and 4, and hence its description is omitted.

The horizontal deflection circuit of the embodiment which has the configuration described above can attain the following effects in addition to those of the horizontal deflection circuit of the ninth embodiment of the invention. When the switch element 5 is turned on, the voltage across the capacitor 56 is directly applied across the horizontal deflection coil 10, and hence the deflection current IL of the horizontal deflection coil 10 becomes steeper. Accordingly, a voltage (about 600 V) across the capacitor 56 which is lower than that used in the configuration of FIG. 13 is sufficient for supplying the deflection current IL of the same level, and hence the voltage of the input voltage 1 can be about 300 V, thereby further lowering the input level of the input voltage 1. This allows a rectifying and smoothing circuit for generating the input voltage 1, to have a low dielectric strength. Even when the switch elements 4 and 5 are simultaneously turned on by an accidental erroneous operation, the short-circuit current can be restricted by the serial capacitor 11, thereby increasing the reliability. Since the voltage across the capacitor 11 is superposed on the voltage 2VIN across the capacitor 56 as shown in FIG. 17, however, the switch elements 4 and 5 must be switch elements which have the same dielectric strength (about 800 V) as that in the ninth embodiment of the invention.

Embodiment 12

Hereinafter, a twelfth embodiment of the invention will be described with reference to the drawings.

Figure 18:
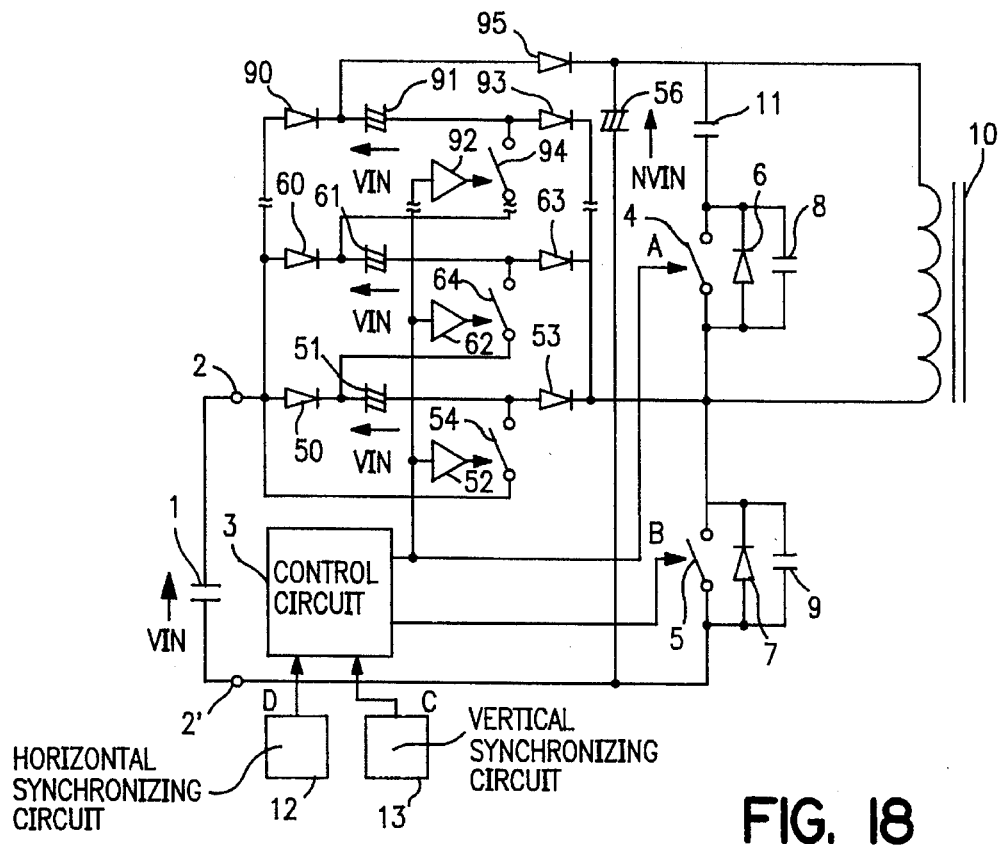
FIG. 18 is a circuit diagram of a horizontal deflection circuit which is a twelfth eleventh embodiment of the invention.

In FIG. 18, 1 designates an input voltage, 2 and 2' designate input terminals, 3 designates a control circuit, 4 and 5 designate switch elements, 6 and 7 designate diodes, 8 and 9 designate capacitors, 10 designates a horizontal deflection coil, 12 designates a horizontal synchronizing circuit, 13 designates a vertical synchronizing circuit, 50 designates a diode, 51 designates a capacitor, 52 designates a driving circuit, 53 designates a diode, 54 designates a switch element, and 56 designates a capacitor. These components are configured in the same manner as those of FIG. 16. The embodiment is different from the configuration of FIG. 16 in the following points: A plurality of series circuits which are configured in the same manner by diodes 60 and 90, capacitors 61 and 91, diodes 63 and 93, etc. are connected in parallel to the series circuit of the diode 50, the capacitor 51, and the diode 53. Driving circuits 62 and 92 which operate in synchronism with the driving circuit 52, and switch elements 64 and 94 which are driven by the respective driving circuits are respectively connected to one terminal of the capacitor 51 and another terminal of the capacitor 61, and to the one terminal of the capacitor 61 and another terminal of the capacitor 91. In other words, the capacitors of the above-mentioned plural series circuits are connected in series through the switch elements. The one terminal of the capacitor 91 is connected to the capacitor 56 through a diode 95 so that a sum voltage of the series voltages of the capacitors of the above-mentioned plural series circuits, and the input voltage 1 is applied to the capacitor 56.

The operation of the thus configured horizontal deflection circuit will be described. The operation of supplying a voltage to the capacitor 56 from the input voltage 1 is the same as that which has been described in detail in conjunction with FIG. 15, and therefore its description is omitted.

Also the operation of supplying the horizontal deflection current IL to the horizontal deflection coil 10 is the same as that which has been described in detail in conjunction with FIG. 16, and therefore its description is omitted.

The control operation of conducting the vertical line distortion correction by, in synchronism with the vertical deflection, changing the amplitude of the deflection current IL which flows through the horizontal deflection coil 10 is the same as that which have been described in detail in conjunction with FIG. 1 and with reference to FIGS. 3 and 4, and hence its description is omitted.

The horizontal deflection circuit of the embodiment which has the configuration described above can attain the following effects in addition to those of the horizontal deflection circuit of the eleventh embodiment of the invention. In the embodiment, although a voltage of about 700 V is required as the voltage across the capacitor 56, a voltage of about 175 V or 700/(N+1) V which is one fourth or one (N+1)th of the voltage across the capacitor 56 can be used as the input voltage 1. Consequently, the input voltage can be lower than that used in the eleventh embodiment of the invention, whereby the power source can be miniturized and safety provisions such as the retainment of a safe distance can be relaxed.

Figure 19:
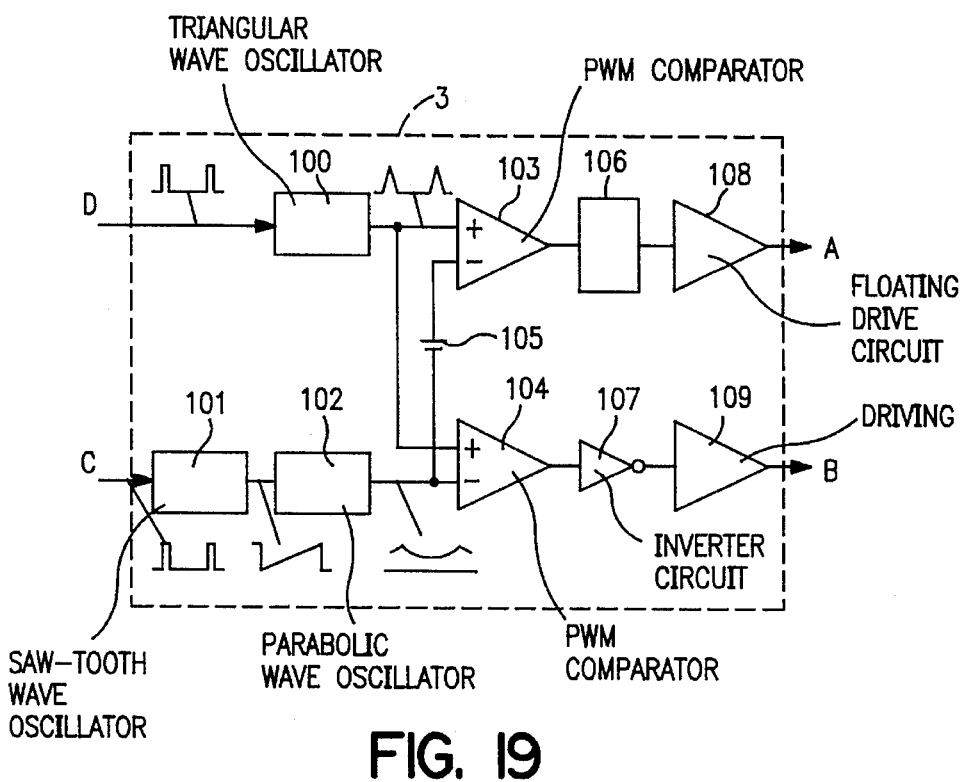
FIG. 19 is a circuit diagram of a control circuit shown in the fist to twelfth embodiments of the invention.

A specific example of the configuration of the control circuits used in the first to twelfth embodiments is shown in FIG. 19. FIG. 19 shows the configuration of the control circuit 3 as an example of the circuit configuration for realizing the control operation. In FIG. 19, 100 designates a triangular wave oscillator which receives the horizontal synchronizing pulse D and outputs a triangular oscillation wave synchronized with the horizontal blanking interval. The reference numeral 101 designates a saw-tooth wave oscillator which receives the vertical synchronizing pulse C and outputs a saw-tooth wave synchronized with the vertical interval, and 102 designates a parabolic wave oscillator which receives the output of the saw-tooth wave oscillator 101 and outputs a parabolic wave-like voltage synchronized with the vertical interval. The reference numeral 103 designates a PWM comparator which compares the output of the triangular wave oscillator 100 with a voltage obtained by superposing an offset voltage 105 on the output of the parabolic wave oscillator 102, and which outputs an on/off signal, and 104 designates a PWM comparator which compares the output of the triangular wave oscillator 100 with the output of the parabolic wave oscillator 102, and which outputs an on/off signal. The reference numeral 105 designates the offset voltage which sets the dead time between the on/off signals of the comparators 103 and 104, 106 designates a level shift circuit which makes the on/off output of the comparator 103 floating, and 107 designates an inverter which inverts the on/off output of the comparator 104 so that the on/off signals of the comparators 103 and 104 are alternately made on and off. The reference numeral 108 designates a floating driving circuit that amplifies the on/off output of the level shift circuit 106 to a level at which the switch element 4 can be driven, and outputs the on/off driving pulse A, and 109 designates a driving circuit that amplifies the on/off output of the inverter 107 to a level at which the switch element 5 can be driven, and outputs the on/off driving pulse B. The operations of these components have been described in the description of the embodiments, and therefore their description is omitted.

The circuits including the other control circuits described in the embodiment may have configurations other than those described above and use gate array ICs, a microcomputer, etc., so that preset functions are conducted by means of programs and logical operations. It is a matter of course that such an arrangement can conduct the improvement of preset accuracy and more complex control operations.

Figure 20:
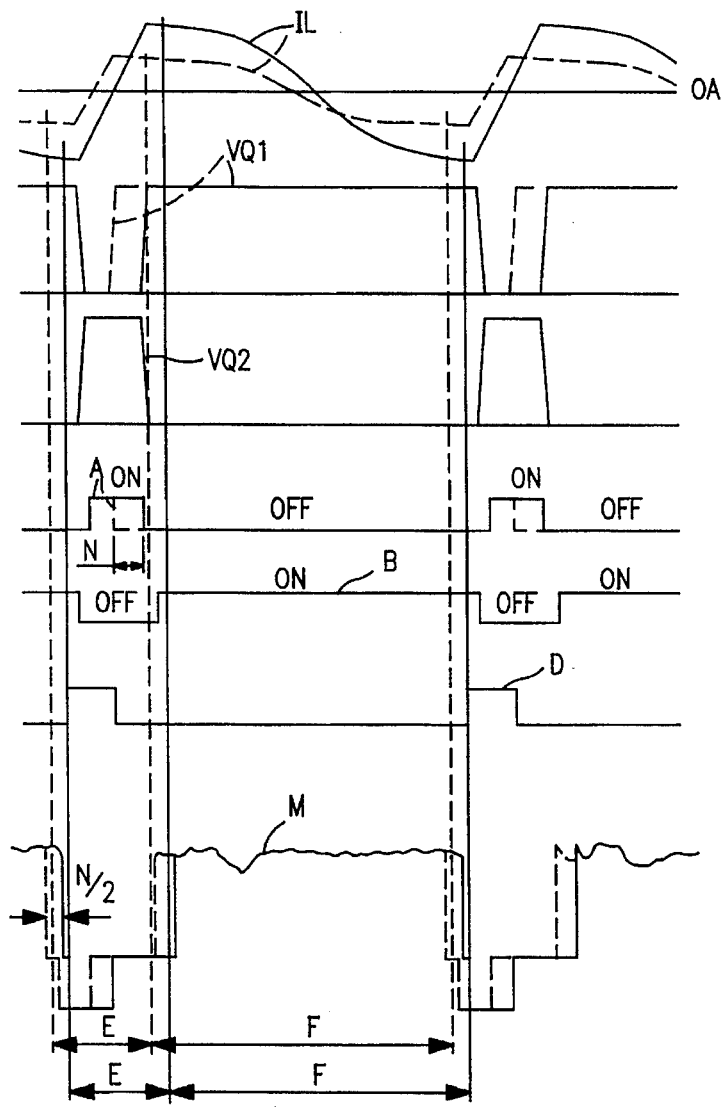
FIG. 20 is a waveform chart illustrating other operations of various portions of the control circuit in the invention.
Figure 21:
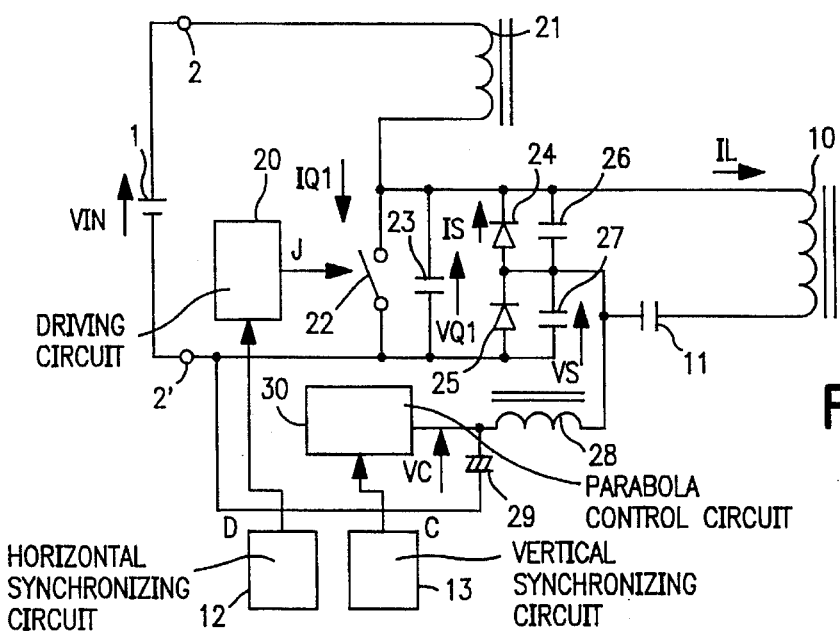
FIG. 21 is a circuit diagram of a prior art horizontal deflection circuit.
Figure 22:
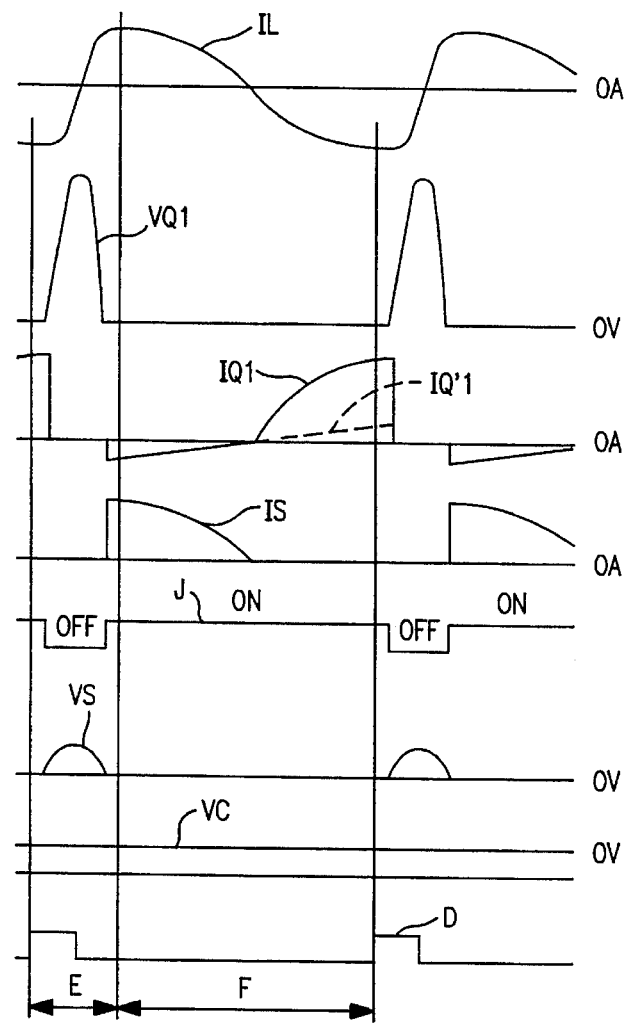
FIG. 22 is a waveform chart illustrating the operations of various portions of the prior art horizontal deflection circuit.
Figure 23:
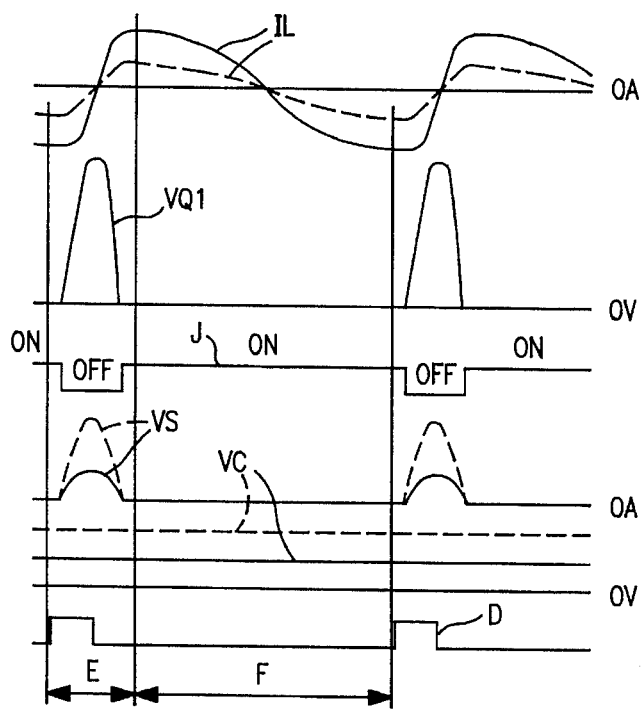
FIG. 23 is a waveform chart illustrating the operations of various portions of the prior art horizontal deflection circuit.
Figure 24:
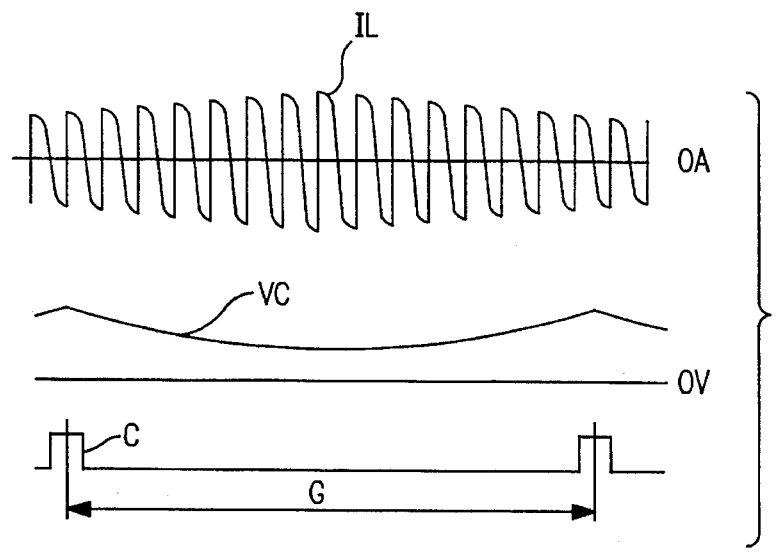
FIG. 24 is a waveform chart illustrating the operations of various portions of the prior art horizontal deflection circuit.

In the first to twelfth embodiments, by controlling the on/off driving pulses of the control circuits 3, 17 and 18, the positive and negative portions of the deflection current IL of the horizontal deflection coil 10 in the horizontal deflection interval F are made equal to each other so that the symmetry of the deflection angles in the right and left portions of the screen is maintained, and the on and off periods of the switch elements 4 and 5 are changed so that the changeable amounts H of the on/off driving pulses of the control circuit 3 in the right and left sides about the center of the horizontal blanking interval E are equal to each other. Alternatively, the video signal M and the horizontal synchronizing pulse of the horizontal synchronizing circuit 12 may be shifted by a period N/2 which is a half of N indicative of the change of the on period of the switch element 4, by changing only the on and off periods of the switch element 4 while fixing those of the switch element 5 as shown in the waveform chart of FIG. 20 illustrating the operations of various portions. Also in this case, the positive and negative portions of the deflection current IL of the horizontal deflection coil 10 in the horizontal deflection interval F can be made equal to each other in a similar manner so that the symmetry of the deflection angles in the right and left portions of the screen is maintained. FIG. 20 is a waveform chart illustrating the operations of various portions. In the figure, the waveforms similar to those of FIG. 2 are identified by the same symbols, and their description is omitted. In FIG. 20, M indicates the waveform of the video signal, and N indicates the change amount of the on period of the on/off driving pulses of the switch element 4 of the control circuit 3, 17 or 18.

In the first to twelfth embodiments, the switch elements functioning as the switch elements 4 and 5 may be bipolar transistors, IGBTs, SITs, or the like. When field effect transistors (MOSFETs) are used, particularly, the diodes 6 and 7 may be omitted because such a transistor incorporates a parasitic diode.

In the first to twelfth embodiments, the capacitors 8 and 9 are inserted in order to reduce the switching loss and noise of the switch elements. It is a matter of course that these capacitors may be omitted without producing any problem in operation.

In the first to twelfth embodiments, it is a matter of course that, in order to conduct a correction other than the above-mentioned S-shape correction and the vertical line distortion correction, various circuits are connected in parallel or series to the horizontal deflection coil 10 in the same manner as the prior art.

In the first to twelfth embodiments, only one horizontal deflection coil 10 is used. In a projection type video apparatus wherein plural cathode ray tubes constitute a single screen, a plurality of horizontal deflection coils 10 must be driven. It is a matter of course that a configuration may be realized in which plural horizontal deflection coils 10 are simultaneously connected in parallel.

In the first to twelfth embodiments, only one horizontal deflection coil 10 is used. In a projection type video apparatus wherein plural cathode ray tubes constitute a single screen, a plurality of horizontal deflection coils 10 must be driven. It is a matter of course that a configuration may be realized in which the control circuit 3 is commonly used, and sets of switch elements 4 and 5 are respectively connected to plural horizontal deflection coils 10 and simultaneously driven.

As described above, according to the invention, provided are the configuration which comprises: a series circuit of first and second switch means and connected to positive and negative terminals of the DC power source; a series circuit of a horizontal deflection coil and the first capacitor and connected across the first switch means; control means for controlling closing and opening operations of the first and second switch means; and first and second diodes respectively connected across the first and second switch means, wherein the control means controls the first and second switch means so that the first and second switch means are alternately closed and opened in synchronism with a horizontal synchronizing signal, and the control means further controls the first and second switch means so that close and open periods of the first and second switch means are changed in synchronism with a vertical synchronizing signal, the configuration in which the control means detects a change of a voltage of the DC power source, and further controls the first and second switch means so that close and open periods of the first and second switch means are changed, and the configuration in which close and open periods of the first and second switch means are changed in accordance with the frequency change of the horizontal synchronizing signal. The excitation of the horizontal deflection coil 10 is conducted by directly applying the input voltage 1 through the switch element, and therefore the applied voltage has a rectangular waveform and switch elements of a dielectric strength lower than that in the prior art can be used. The vertical line distortion correction is conducted by means of a switching operation in which the on/off operations of the switch elements are changed, and hence the loss is extremely reduced unlike the analog modulation conducted by the parabola control circuit 30 of the prior art, and the changeable range of the deflection current IL of the horizontal deflection coil 10 can accurately be set in a wide range so that the PWM control can directly be done from a recent video signal digital processing circuit. This is very advantageous in precision and adjustment. Also the stabilization of the input voltage 1 is not necessary. Even when the horizontal deflection circuit is used in the multi-scan, means for changing the input voltage is not required so that reduced power consumption and reduced cost are realized. Unlike the prior art, it is not required to simultaneously switch capacitors of many resonance circuits. In the prior art, many resonance circuits are used so that a very large number of parts which are relatively large, such as inductance elements and capacitors are used, whereby restrictions are imposed on the cost, shape and stability. By contrast, in the embodiment, parts which can be configured by semiconductor parts such as switch elements are used in a relatively large number, so that, for example, the horizontal deflection circuit can be configured as a hybrid IC or a one-chip IC. Consequently, the circuit is very advantageous also in cost and shape. Furthermore, according to the invention, the configuration is provided in which the first and second switch means which are connected in series to the sixth capacitor are alternately closed and opened in synchronism with a horizontal synchronizing signal; the DC power source is connected in parallel through the third diode, the seventh capacitor, and the fourth diode to the first capacitor and the horizontal deflection coil which are connected across the fist switch means, and to one of the switch means; the fourth switch means which is closed and opened in synchronism with the first or second switch means is connected across the series circuit of the fourth diode and the seventh capacitor; and, when the fourth switch means is closed, the series circuit of the DC power source and the seventh capacitor is connected through the fifth diode to the sixth capacitor. In Embodiments 9 and 11, therefore, even when the input voltage is low, the voltage required for operation can be obtained and the input power source can be minituarized and reduced in cost. In Embodiments 10 and 12, furthermore, the circuit can operate at a further lower voltage, and hence safety provisions such as the retainment of a safe distance can be relaxed. The horizontal deflection circuit can be corrected in a wide range in a highly accurate manner. According to the invention, therefore, an excellent horizontal deflection circuit which can be minituarized, reduced in cost and power consumption, and integrated is realized.

What is claimed is:

1. A horizontal deflection circuit comprising:

a first series circuit of first and second switch means, the first series circuit connected to positive and negative terminals of a DC power source;

a second series circuit of a horizontal deflection coil and a first capacitor, the second series circuit connected across said first switch means;

control means for controlling closing and opening operations of said first and second switch means so that said first switch means and said second switch means each have an open time period and a closed time period, the control means further for varying (1) a ratio of the closed time period to the open time period, of the second switch means and (2) a ratio of the closed time period to the open time period, of the first switch means; to correct vertical line distortion; and first and second diodes respectively connected across said first and second switch means;

wherein said control means further controls said first and second switch means so that said first and second switch means are alternately closed and opened in synchronism with a horizontal synchronizing signal, and said control means further controls said first and second switch means so that the closed and open time periods of said first and second switch means are changed in synchronism with a vertical synchronizing signal and in response to a correction signal.

2. A horizontal deflection circuit according to claim 1, wherein said control means detects a change of a voltage of said DC power source, and further controls said first and second switch means to that close and open periods of said first and second switch means are changed.

3. A horizontal deflection circuit according to claim 1 or 2, wherein said circuit further comprises second and third capacitors which are connected across said first and second switch means, respectively.

4. A horizontal deflection circuit comprising:

a first series circuit of first switch means, a first capacitor, and a second switch means, said first series circuit connected to positive and negative terminals of a DC power source;

a horizontal deflection coil connected across a second series circuit of said first switch means and said first capacitor;

control means for controlling closing and opening operations of said first and second switch means so that said first switch means and said second switch means each have an open time period and a closed time period, the control means further for varying (1) a ratio of the closed time period to the open time period, of the second switch means and (2) a ratio of the closed time period to the open time period, of the first switch means; to correct vertical line distortion; and first and second diodes respectively connected across said first and second switch means;

wherein said control means further controls said first and second switch means so that said first and second switch means are alternately closed and opened in synchronism with a horizontal synchronizing signal, and said control means further controls said first and second switch means so that closed and open time periods of said first and second switch means are changed in synchronism with a vertical synchronizing signal and in response to a correction signal.

5. A horizontal deflection circuit according to claim 4, wherein said control means detects a change of a voltage of said DC power source, and further controls said first and second switch means so that close and open periods of said first and second switch means are changed.

6. A horizontal deflection circuit according to claim 4 or 5, wherein said circuit further comprises second and third capacitors which are connected across said first and second switch means, respectively.

7. A horizontal deflection circuit comprising:

a first series circuit of first and second switch means, the first series circuit connected to positive and negative terminals of a DC power source;

a second series circuit of a horizontal deflection coil and a first capacitor, the second series circuit connected across said first switch means;

control means for controlling closing and opening operations of said first and second switch means so that said first switch means and said second switch means each have an open time period and a closed time period, the control means further for varying (1) a ratio of the closed time period to the open time period, of the second switch means and (2) a ratio of the closed time period to the open time period, of the first switch means, to correct vertical line distortion;

first and second diodes respectively connected across said first and second switch means; and a third series circuit of at least one third switch means and a fourth capacitor, the third series circuit connected across said first capacitor, wherein said third switch means is externally controlled to be closed and opened so as to correspond to a frequency change of a horizontal synchronizing signal;

said control means further controls said first and second switch means so that said first and second switch means are alternately closed and opened in synchronism with the horizontal synchronizing signal, said control means further controls said first and second switch means so that the closed and open time periods of said first and second switch means are changed in synchronism with a vertical synchronizing signal and in response to a correction signal, and said control means further controls said first and second switch means so that the closed and open time periods of said first and second switch means are changed in response to the frequency change of the horizontal synchronizing signal.

8. A horizontal deflection circuit according to claim 7, wherein said control means detects a change of a voltage of said DC power source, and further controls said first and second switch means so that close and open periods of said first and second switch means are changed.

9. A horizontal deflection circuit according to claim 7 or 8, wherein said circuit further comprises second and third capacitors which are connected across said first and second switch means, respectively.

10. A horizontal deflection circuit comprising:

a first series circuit of first switch means, a first capacitor, and a second switch means, the first series circuit connected to positive and negative terminals of a DC power source;

a horizontal deflection coil connected across a second series circuit of said first switch means and said first capacitor;

control means for controlling closing and opening operations of said first and second switch means so that said first switch means and said second switch means each have an open time period and a closed time period, the control means further for varying (1) a ratio of the closed time period to the open time period, of the second switch means and (2) a ratio of the closed time period to the open time period, of the first switch means; to correct vertical line distortion;

first and second diodes respectively connected across said first and second switch means; and a third series circuit of at least one third switch means and a fourth capacitor, the third series circuit connected across said first capacitor, wherein said third switch means is externally controlled to be closed and opened so as to correspond to a frequency change of a horizontal synchronizing signal;

said control means further controls said first and second switch means so that said first and second switch means are alternately closed and opened in synchronism with the horizontal synchronizing signal, said control means further controls said first and second switch means so that the closed and open time periods of said first and second switch means are changed in synchronism with a vertical synchronizing signal and in response to a correction signal, and said control means further controls said first and second switch means so that the closed and open time periods of said first and second switch means are changed in accordance with the frequency of the horizontal synchronizing signal.

11. A horizontal deflection circuit according to claim 10, wherein said control means detects a change of a voltage of said DC power source, and further controls said first and second switch means so that close and open periods of said first and second switch means are changed.

12. A horizontal deflection circuit according to claim 10 or 11, wherein said circuit further comprises second and third capacitors which are connected across said first and second switch means, respectively.

13. A horizontal deflection circuit comprising:

a first series circuit of first switch means and second switch means, the first series circuit connected across a fifth capacitor;

a second series circuit of a horizontal deflection coil and a first capacitor, the second series circuit connected across said first switch means;

control means for controlling closing and opening operations of said first and second switch means; and first and second diodes respectively connected across said first and second switch means;

wherein said control means controls said first and second switch means so that said first and second switch means are alternately closed and opened in synchronism with a horizontal synchronizing signal, said control means further controls said first and second switch means so that close and open periods of said first and second switch means are changed in synchronism with a vertical synchronizing signal and in in response to a correction signal;

a DC power source is connected to one of said first and second switch means through a third diode, a sixth capacitor, and a fourth diode;

a fourth switch means which is closed and opened in synchronism with said first or second switch means is connected across a series circuit of said fourth diode and said sixth capacitor, and, when said fourth switch means is closed, a series circuit of said DC power source, said fourth switch means, and sixth capacitor is connected in parallel across said fifth capacitor through a fifth diode.

14. A horizontal deflection circuit according to claim 13, wherein at least one third series circuit configured by a series connection of a sixth diode, a seventh capacitor and a seventh diode is connected in parallel to a series circuit configured by said third diode, said sixth capacitor and said fourth diode, said sixth capacitor, and said seventh capacitor in said third series circuit are connected to each other by at least one fifth switch means which is closed and opened in synchronism with said fourth switch means so that all of said capacitors are connected in series, and, when said fourth and fifth switch means are closed, a fourth series circuit in which all of said DC power source, said fourth switch means, said sixth capacitor, said seventh capacitors of said third series circuit, and said fifth switch means are connected in series is connected in parallel across said fifth capacitor through said fifth diode.

15. A horizontal deflection circuit according to claim 13 or 14, wherein said control means detects a change of a voltage of said DC power source, and further controls said first and second switch means so that close and open periods of said first and second switch means are changed.

16. A horizontal deflection circuit according to claim 13 or, wherein said circuit further comprises second and third capacitors which are connected across said first and second switch means, respectively.

17. A horizontal deflection circuit comprising:
  a first series circuit of first switch means, a first capacitor, and a second switch means, the first series circuit connected across a fifth capacitor;
  a horizontal deflection coil connected across a second series circuit of said first switch means and said first capacitor;
  control means for controlling closing and opening operations of said first and second switch means; and
  first and second diodes respectively connected across said first and second switch means;
  wherein said control means controls said first and second switch means so that said first and second switch means are alternately closed and opened in synchronism with a horizontal synchronizing signal, said control means further controls said first and second switch means so that close and open periods of said first and second switch means are changed in synchronism with a vertical synchronizing signal and in in response to a correction signal;
  a DC power source is connected to one of said first and second switch means through a third diode, a sixth capacitor, and a fourth diode; and
  a fourth switch means which is closed and opened in synchronism with said first or second switch means is connected across a series circuit of said fourth diode and said sixth capacitor, and, when said fourth switch means is closed, a series circuit of said DC power source, said fourth switch means, and said sixth capacitor is connected in parallel across said fifth capacitor through a fifth diode.

18. A horizontal deflection circuit according to claim 17, wherein at least one third series circuit configured by a series connection of a sixth diode, a seventh capacitor and a seventh diode is connected in parallel to a series circuit configured by said third diode, said sixth capacitor and said fourth diode, said sixth capacitor, and said seventh capacitor in said third series circuit are connected to each other by at least one fifth switch means which is closed and opened in synchronism with said fourth switch means so that all of said capacitors are connected in series, and when said fourth and fifth switch means are closed, a fourth series circuit in which all of said DC power source, said fourth switch means, said sixth capacitor, said seventh capacitors of said third series circuit, and said fifth switch means are connected in series is connected in parallel across said fifth capacitor through said fifth diode.

19. A horizontal deflection circuit according to claim 17 or 18, wherein said control means detects a change of a voltage of said DC power source, and further controls said first and second switch means so that close and open periods of said first and second switch means are changed.

20. A horizontal deflection circuit according to claim 17 or, wherein said circuit further comprises second and third capacitors which are connected across said first and second switch means, respectively.

21. A horizontal deflection circuit according to claim 15, wherein said circuit further comprises second and third capacitors which are connected across said first and second switch means, respectively.

22. A horizontal deflection circuit according to claim 19, wherein said circuit further comprises second and third capacitors which are connected across said first and second switch means, respectively.

23. The horizontal deflection circuit recited in claim 1, wherein the control means varies the ratio of the closed time period to the open time period by respectively changing the magnitude of the time duration of the closed time period and the open time period of the first and second switch means.

* * * * *

UNITED STATES PATENT AND TRADE MARK OFFICE
CERTIFICATE OF CORRECTION

PATENT NO.   : 5,550,442
DATED        : August 27, 1996
INVENTOR(S)  : Toshinari Ueyama et al.

It is certified that error appears in the above-identified patent and that said Letters Patent is hereby corrected as shown below:

Column 34, claim 2, line 24, after "means" delete "to" and insert --so--.

Column 37, claim 16, line 16, after "or" insert --14--.

Column 38, claim 20, line 28, after "or" insert --18--.

Signed and Sealed this

Sixth Day of May, 1997

*Attest:*

BRUCE LEHMAN

*Attesting Officer*          *Commissioner of Patents and Trademarks*